(12) United States Patent
Lara et al.

(10) Patent No.: US 9,898,753 B2
(45) Date of Patent: Feb. 20, 2018

(54) METHODS FOR CROSS-MARKET BRAND ADVERTISING, CONTENT METRIC ANALYSIS, AND PLACEMENT RECOMMENDATIONS

(75) Inventors: Ankarino Lara, San Francisco, CA (US); Scott Bedard, San Francisco, CA (US); Anthony D. Chen, Santa Monica, CA (US); Shravan K. Goli, San Jose, CA (US); Alexei Stoliartchouk, San Francisco, CA (US)

(73) Assignee: Excalibur IP, LLC, New York, NY (US)

( * ) Notice: Subject to any disclaimer, the term of this patent is extended or adjusted under 35 U.S.C. 154(b) by 1866 days.

(21) Appl. No.: 11/863,187

(22) Filed: Sep. 27, 2007

(65) Prior Publication Data
US 2009/0089141 A1  Apr. 2, 2009

(51) Int. Cl.
*G06Q 30/02* (2012.01)
(52) U.S. Cl.
CPC ......... *G06Q 30/0244* (2013.01); *G06Q 30/02* (2013.01)
(58) Field of Classification Search
CPC ..................................................... G06Q 40/00
USPC ........................................... 705/35, 14, 14.4
See application file for complete search history.

(56) References Cited

U.S. PATENT DOCUMENTS

| | | | |
|---|---|---|---|
| 7,188,342 B2 | 3/2007 | DeMello et al. | |
| 7,962,931 B2 | 6/2011 | Bova | |
| 8,103,547 B2 | 1/2012 | Mah et al. | |
| 8,106,766 B2 | 1/2012 | Gold | |
| 8,290,982 B2 | 10/2012 | Lara et al. | |
| 8,521,590 B1 | 8/2013 | Hanusch | |
| 8,538,842 B2 | 9/2013 | Matkowsky | |
| 8,655,737 B1 | 2/2014 | Tromble | |

(Continued)

*Primary Examiner* — Bruce I Ebersman
*Assistant Examiner* — John Anderson
(74) *Attorney, Agent, or Firm* — Martine Penilla Group, LLP

(57) ABSTRACT

In another embodiment, a computer-implemented method for processing and optimizing selection of placement, of advertising content related to a brand, in websites of a network is provided. The computer-implemented method is processed by a server in response to communication from a user that is connected to the server over the Internet. The method includes receiving from the user, attributes of an advertisement to be placed on a brand-centric website that relates to the brand, and also receiving selections for types of websites to place the advertisement. The types of websites do not have to be brand-centric websites, but should include content related to the brand. Then, the method includes obtaining metrics from selected websites and historical performance for similar advertisements when placed on the selected websites. The method includes processing the obtained metrics and historical performance to preliminarily define an advertising model. The advertising model defines a score correlated to effectiveness of the advertisement. Optimizing the advertising model is then performed to define a recommended advertising model, where the recommended advertising model defines optimal selections of websites for placement of the advertisement. The optimizing uses multivariable optimization to correlate the obtained metrics to a desired optimization criteria.

25 Claims, 19 Drawing Sheets

(56) References Cited

U.S. PATENT DOCUMENTS

| | | |
|---|---|---|
| 8,721,456 B2 | 5/2014 | Ganz et al. |
| 8,799,068 B2 | 8/2014 | Kendall et al. |
| 2002/0022970 A1 | 2/2002 | Noll et al. |
| 2005/0144072 A1* | 6/2005 | Perkowski et al. ............ 705/14 |
| 2006/0190333 A1* | 8/2006 | Choi ..................... G06Q 30/02 705/14.51 |
| 2007/0033105 A1* | 2/2007 | Collins ............. G06Q 10/0631 705/14.53 |
| 2007/0282874 A1* | 12/2007 | Metcalfe ...................... 707/101 |
| 2008/0104012 A1 | 5/2008 | Nolan et al. |
| 2008/0195462 A1* | 8/2008 | Magdon-Ismail ..... G06Q 10/04 705/7.33 |
| 2008/0262907 A1* | 10/2008 | Broady ................. G06Q 30/02 705/14.46 |
| 2009/0157484 A1 | 6/2009 | Konowe |
| 2009/0265243 A1* | 10/2009 | Karassner et al. ......... 705/14.54 |
| 2010/0145794 A1* | 6/2010 | Barger et al. ............. 705/14.45 |
| 2010/0174661 A1 | 7/2010 | Kaskoun et al. |
| 2010/0205057 A1 | 8/2010 | Hook et al. |
| 2010/0312572 A1* | 12/2010 | Ramer ................... G06Q 30/02 705/1.1 |
| 2011/0029388 A1 | 2/2011 | Kendall et al. |
| 2011/0113063 A1 | 5/2011 | Schulman et al. |
| 2011/0119278 A1 | 5/2011 | Hunn et al. |
| 2011/0246305 A1 | 10/2011 | Brazeau |
| 2012/0022937 A1 | 1/2012 | Bhatia et al. |
| 2013/0013416 A1 | 1/2013 | Stein |
| 2013/0085803 A1 | 4/2013 | Mauro et al. |
| 2013/0125013 A1 | 5/2013 | Lettau et al. |
| 2013/0166457 A1 | 6/2013 | Du et al. |
| 2014/0181150 A1 | 6/2014 | Hancock |
| 2014/0278921 A1 | 9/2014 | Sankaran et al. |
| 2014/0279251 A1 | 9/2014 | Cheng et al. |
| 2014/0297419 A1 | 10/2014 | Ramachandra |
| 2015/0025948 A1 | 1/2015 | Sankaran et al. |
| 2015/0081417 A1 | 3/2015 | Golden et al. |
| 2015/0113384 A1 | 4/2015 | Tymoshenko et al. |
| 2015/0149373 A1 | 5/2015 | Chhaya et al. |
| 2015/0186931 A1 | 6/2015 | Flake |
| 2015/0302434 A1 | 10/2015 | Jagannathan |

* cited by examiner

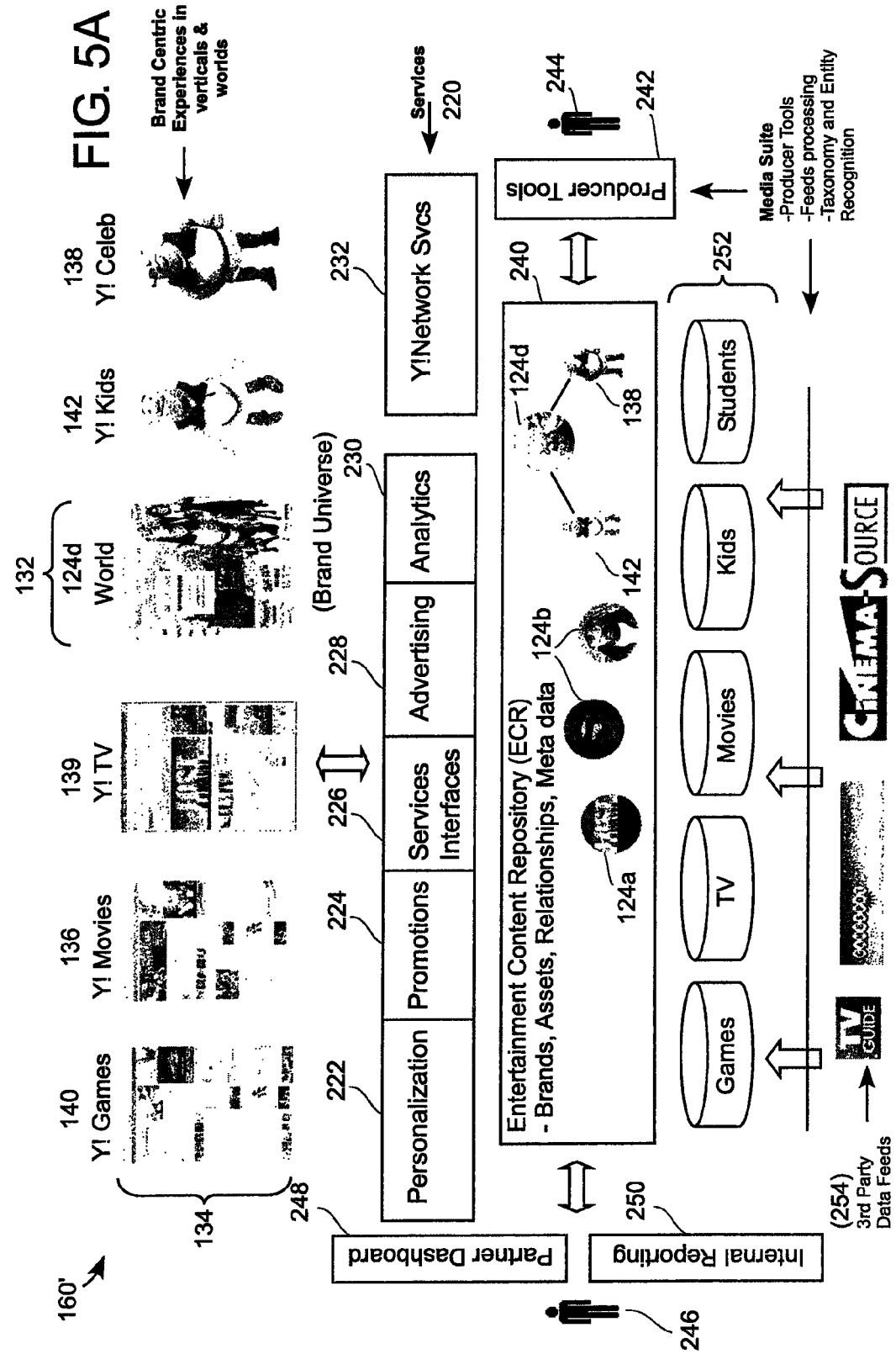

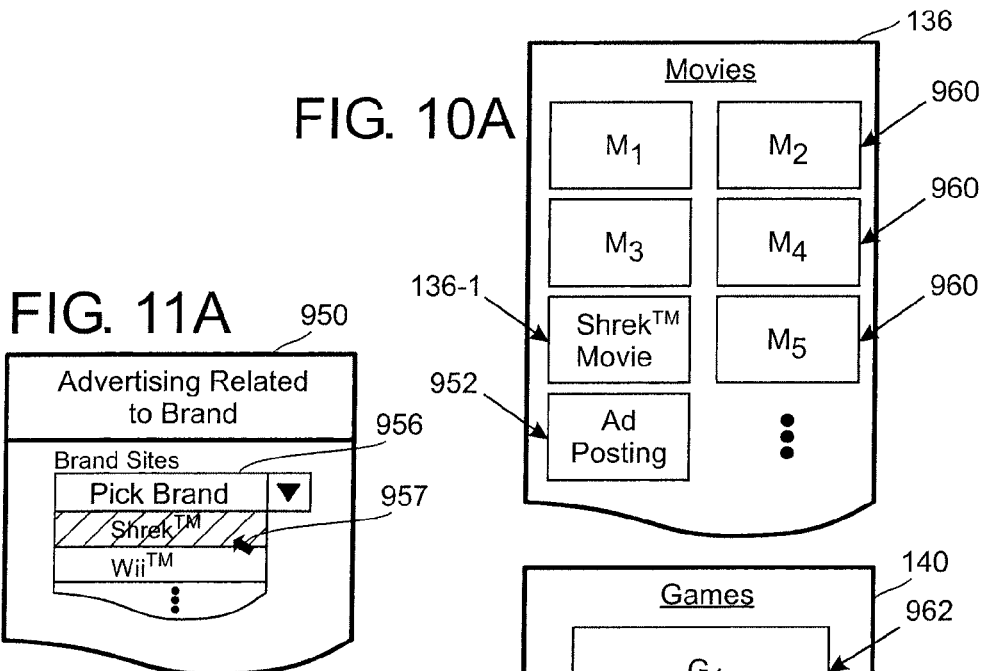
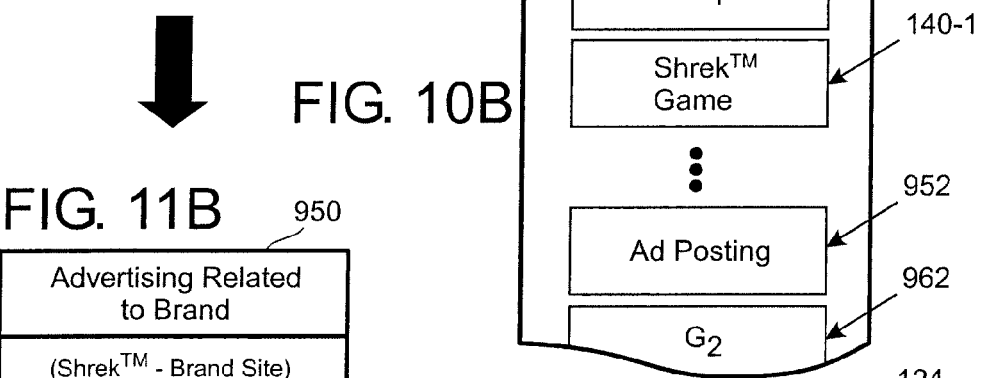
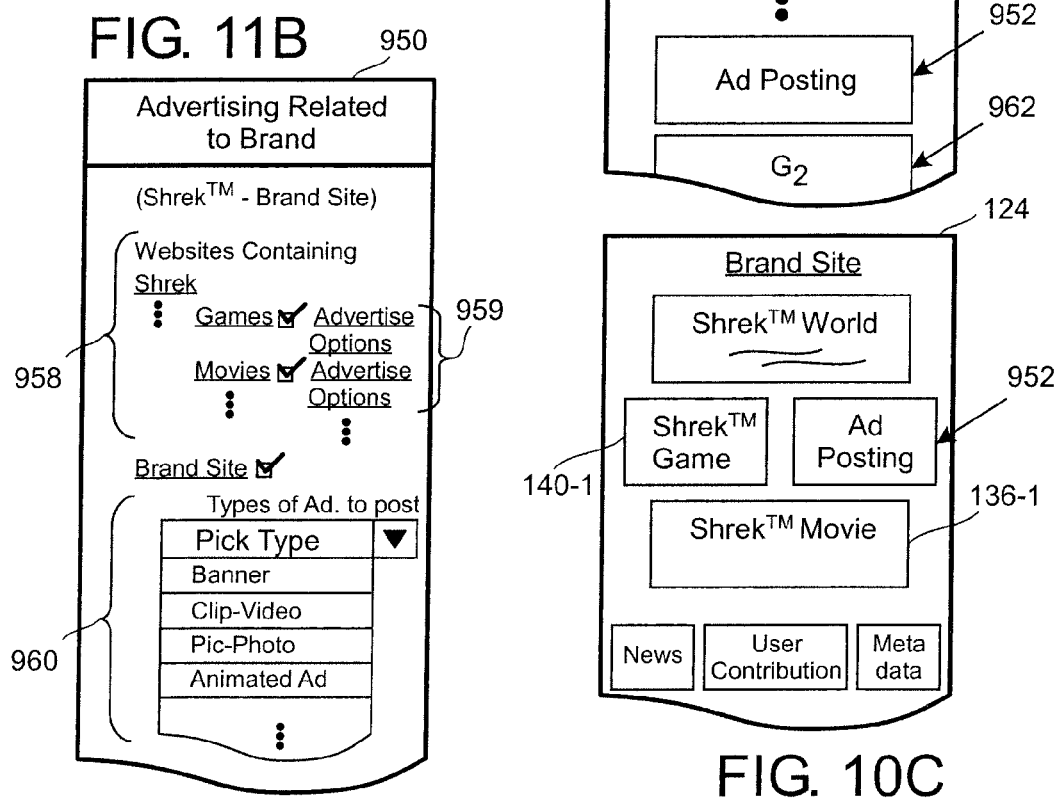
FIG. 10A
FIG. 11A
FIG. 10B
FIG. 11B
FIG. 10C

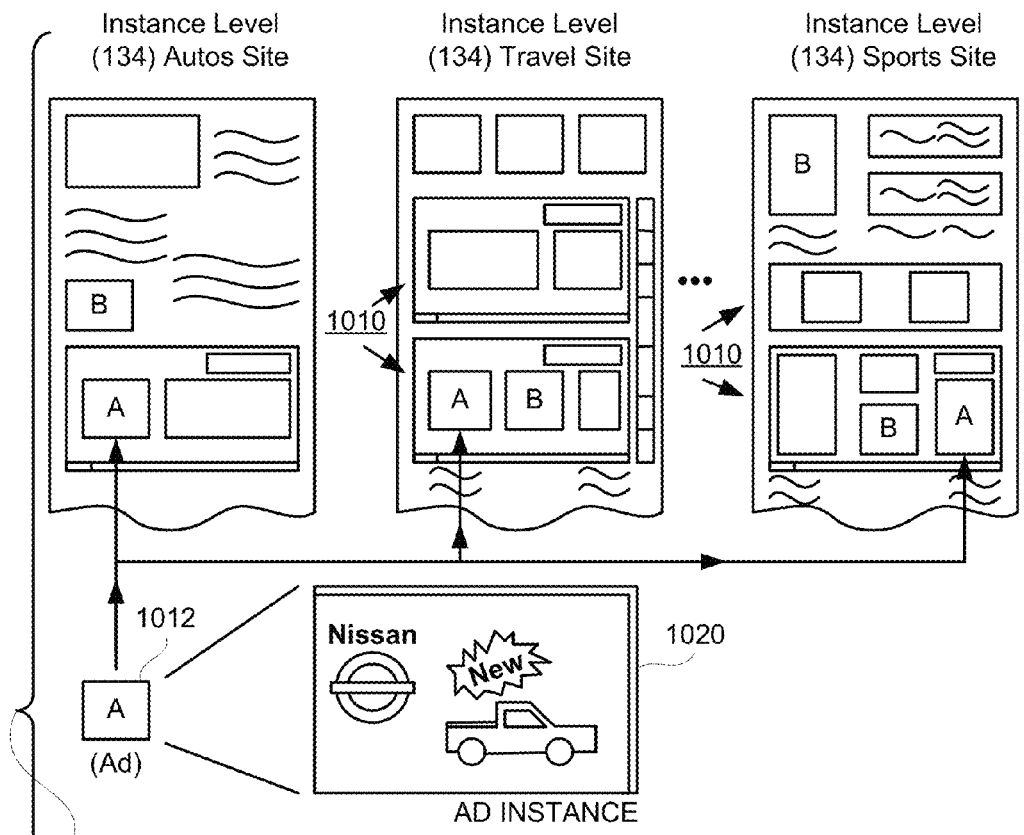
FIG. 12
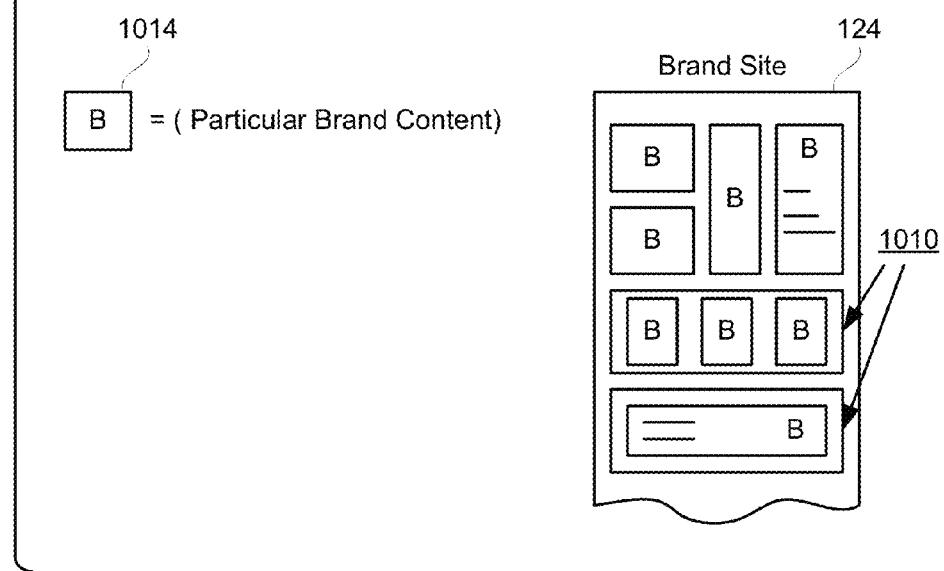

METHODS FOR CROSS-MARKET BRAND ADVERTISING, CONTENT METRIC ANALYSIS, AND PLACEMENT RECOMMENDATIONS

This Application is related to co-pending: (1) patent application Ser. No. 11/736,560, filed on Apr. 17, 2007, entitled "Systems and Methods for Managing a Brand universe for User Information, Brand Related Marketing and User Interactivity" (2) patent application Ser. No. 11/736,571, filed on Apr. 17, 2007, entitled "Methods For Promoting Brand-Centric Advertising and Managing the Same", (3) patent application Ser. No. 11/863,204, filed on the same day as the instant application, and entitled "Methods for Managing Content for Brand Related Media"; and (4) patent application Ser. No. 11/863,202, filed on the same day as the instant application, and entitled "Methods of Ranking Content for Brand Centric Websites", each of which is incorporated herein by reference.

BACKGROUND

1. Field of the Invention

The present invention relates to methods for generating and managing brand data from various sources and to the access and management of the brand content by brand owner or brand managers.

2. Description of the Related Art

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

Currently to date, however, content data is presented on websites for specific content-type theme, and several brands may be presented (especially if the website is a commercial website). Although some media, news and entertainment websites attempt to cover lots of information and on many different topics, the content related to any brand mentioned on the site is only in limited scale. If users are interested in finding more information about a specific brand, the user must begin an intensive search for that brand content. Unfortunately for the user, the search of a brand may turn up many pages, websites, and sources that speak about the brand, but in order to gain the best understanding about the particular brand, the user will have to move from site-to-site, to assemble a full understanding or gain the information they desire.

The user, in this example, would feel disconnected with the brand, when all is said and done, and the user may find him or herself exhausted from the search and sometimes useless reading and web navigation. As a result, these users, although they may have an interest or desire to lean more about a brand, will not find the process inviting nor incite a connection to the brand. Furthermore, if other users also seek access to similar knowledge about the same brand, those other users will not have knowledge about others having or desiring the same experience. Consequently, user experiences regarding particular brands tend to happen in a relative vacuum.

It is in this context that embodiments of the invention arise.

SUMMARY

Embodiments of the present invention provide methods and computer implemented systems that provide content to be obtained, rendered, and produced to define a brand centric site, in the form of an internet site. The internet site will be accessible by any device having access to the internet, whether it be traditional desktop computers, wireless portable devices, televisions and any device capable of obtaining the content and displaying the content for user consumption. A brand centric site is a site generated by a system that obtains (or uses instances of) brand related data from disparate content sources over the internet, assembles the content at a centric and dynamic location, and enables interactivity and brand data contribution (in terms of content, feedback, ratings, postings, uploads, comments, etc.). The brand contribution can be by the brand owners, brand site managers, users, advertisers, etc. As the system pulls content from users themselves, disparate sites and data content channels, to dynamically generate brand sites, and users of the sites are encouraged to participate more and eventually grow into a passionate fan of the brand, as supported by the brand site.

A benefit of having users fully engaged in the brand is that brand owners will immediately have a pool of users that are likely to be receptive to new or additional brand products and services. The brand products and services may also be tangentially related products and services, which may see high reception from the fan base of particular brand sites. A benefit from the consumer's standpoint is, that the consumer feels in control of his participation in the brand site. For example, the consumer can rate content, cause content to be removed or promoted, the consumer can add his or her personal contribution to the brand site, and the community can monitor the brand site for content not acceptable to the site. Over time, users are also provided the flexibility to customize their likes and dislikes to cause changes to the presentation of the site content or deletion. If users are not registered to a particular brand site, the brand site will dynamically change in content and presentation depending on the community of user's feedback and interactivity. If a user is signed in to the site, the content and presentation can change in presentation or existence depending on the user's behavior or selected preferences.

By user behavior, it is meant that the system will monitor user activity and determine best placements and presentation of content, to best pull more user interactivity from the user. If the user is signed in, the content placement and its presentation on the site can be controlled by both the user's interactivity behavior and also by the interactivity of the community. In some cases, the user will only desire personalization based on his or her own preferences.

It should be appreciated that the present invention can be implemented in numerous ways, such as a process, an apparatus, a system, a device or a method on a computer readable medium. Several inventive embodiments of the present invention are described below.

In one embodiment, a method for defining advertising content related to a brand is provided. The method includes defining attributes of an advertisement to be placed on a brand-centric website that relates to the brand. Then, selecting types of websites to place the advertisement. The types of websites do not have to be brand-centric websites, but should include content related to the brand. The method obtains metrics from selected websites and historical performance for similar advertisements when placed on the selected websites. Then, the method processes the obtained metrics and historical performance to preliminarily define an advertising model, where the advertising model defines a score correlated to effectiveness of the advertisement. The method also includes optimizing the advertising model to define a recommended advertising model. The recommended advertising model defines optimal selections of websites for placement of the advertisement.

In another embodiment, a computer-implemented method for processing and optimizing selection of placement, of advertising content related to a brand, in websites of a network is provided. The computer-implemented method is processed by a server in response to communication from a user that is connected to the server over the Internet. The method includes receiving from the user, attributes of an advertisement to be placed on a brand-centric website that relates to the brand, and also receiving selections for types of websites to place the advertisement. The types of websites do not have to be brand-centric websites, but should include content related to the brand. Then, the method includes obtaining metrics from selected websites and historical performance for similar advertisements when placed on the selected websites. The method includes processing the obtained metrics and historical performance to preliminarily define an advertising model. The advertising model defines a score correlated to effectiveness of the advertisement. Optimizing the advertising model is then performed to define a recommended advertising model, where the recommended advertising model defines optimal selections of websites for placement of the advertisement. The optimizing uses multivariable optimization to correlate the obtained metrics to a desired optimization criteria.

In still another embodiment, a system for processing and optimizing selection of placement, of advertising content related to a brand, in websites of a network, is provided. The system includes an ad processing server in communication with a remote computer accessed by a user. The ad processing server receives attributes from the remote computer of an advertisement to be placed in relation to a brand-centric website. The ad processing server receives selections for types of websites to place the advertisement, and the types of websites do not have to be brand-centric websites, but should include content related to the brand. The system also includes a metrics server for processing metrics for the selected websites and historical performance for similar advertisements when placed on the selected websites. The metrics server processing metrics and historical performance being used to preliminarily define an advertising model, such that the advertising model defines a score correlated to effectiveness of the advertisement. An optimization engine is provided to process the metrics and historical performance. The optimization engine is configured to perform multivariable optimization to generate a recommended advertising model, and the recommended advertising model defines optimal selections of websites for placement of the advertisement. The brand-centric website that relates to the brand is defined by one or more modules, each module contains one or more of text, images, video clips, or graphics, and each module includes at least some content related to the brand.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 5A illustrates a system diagram of components that are accessed interfaced to define brand content that is used to generate a brand site, in accordance with one embodiment.

FIGS. 10A-10C illustrate examples of ad content being associate with particular brand content, and its association across brand instances, in accordance with one embodiment.

FIGS. 11A-11E illustrate example advertising interfaces, in accordance with one embodiment.

FIG. 12 illustrates a graphical representation of a plurality of instance-level websites, as related to acceptance of proposed advertising, in accordance with one embodiment of the present invention.

DETAILED DESCRIPTION

Broadly speaking, the embodiments of the present invention provide systems and methods for enabling brand centric presentation, management, and interaction with media related to particular brands. Each particular brand is managed at and by a single brand site (referred to herein also as "brand universe" and "brand world"), that collects brand centric data, news, information, services, products, current events, user interactivity, etc., from disparate channels (other sites), and blends them together into the single brand site. The content obtained from other channels will represent an instance of the content, as that content can exist in both the other sites and on the brand site. Thus, updates at the brand site or at the originating sites will populate so that the best most current information is maintained in relation to a brand site.

Brand universe is a system that is designed to serve passionate fans of specific entertainment brands by providing them a single and immersive place to "hang out" together online. Brand universe is designed to meet a fan's emotional need for a connection with a brand in addition to filling a functional need for information or services. As these needs are filled, a unified interface to the brand is provided, which assists in deepening and strengthening relations with existing fans of the brand and also assist in introducing a unified brand view to new consumers. These new customers, by virtue of the dynamic experience, will be converted into fans of the brand. As users (e.g., fans) interact with the unified brand site(s), user interactivity can be tracked to develop metrics regarding uses, likes, dislikes, interactions, and commercial benefits to supporters of the brand (e.g., advertisers). This tracking of consumer/brand transactions will enable functional reporting of these metrics. These metrics can then be used by marketers of products related to the brand, to determine likelihood of success and revenue generation if products or services are marketed on particular brand sites.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention. Several exemplary embodiments of the invention will now be described in detail with reference to the accompanying drawings.

The following description will be broken down into four parts, namely, a System and Functional Overview in (I), a System Management, Content Sharing and Content Contribution description in (II), Cross-Market Brand Ad Placement and Optimization in (III) and a Brand Site Product and Computer-implemented Structure in (IV).

I. The Brand Universe System and Functional Overview

Figure 1:
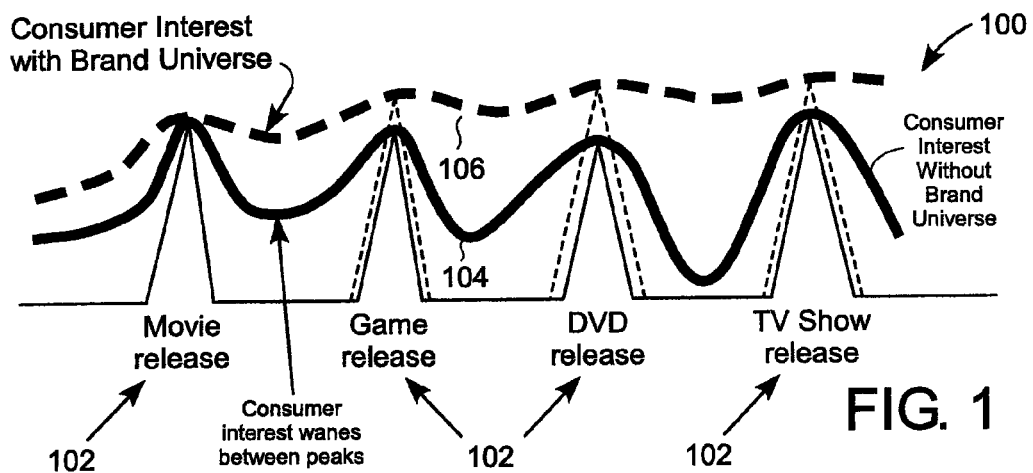
FIG. 1 illustrates how brand events shape or impact consumer interest, in accordance with one embodiment.

In one embodiment, a notion of brand universe is that it powers the place where users spend time between the major transactional events upon which their brand relationship is based. Thus it "fills in the gaps" in their relationship with the brand. This can be illustrated in FIG. 1, which defines a graph 100. Graph 100 defines release events 102 for different products of the brand, or services or media related to a particular brand. Consumer interest without brand universe support would be defined by plot 104, where consumer interest wanes between peaks, defined by the release events 102. Consumer interest with brand universe support is defined by plot 106, where consumer interest is smoothed out more, supporting those times between release events 106.

Thus, by providing a unified and dynamic brand site where fans can hang out online, brand universe smoothes the levels of consumer attention paid to a brand between release events 106 (e.g., transactional events), allowing a "base" level of attention that is higher than the existing state, as well as an ongoing means of communication regarding new brand related transactional opportunities, including microtransaction opportunities that otherwise could not be effectively marketed. For example, the brand universe site can provide fans of Shrek™ with the ability to download a new Shrek™ 3 theme for their desktop. As a standalone feature, this type of transaction could not be efficiently marketed using television, outdoor, print, or radio, but could easily and efficiently be promoted to fans connected to Shrek™ through the brand universe site. In one embodiment, brand sites are defined from stitched together community features from across different content sites. By way of example, the content sites may be the sites created and managed by Yahoo, Inc.™ (e.g., Answers™, BIX, Flickr™, News, Forums, etc.). Other content can come from communities, news, feeds, etc., where such content is presently scattered among disparate sites and networked sources. Of course, the content can come from other sites not managed by Yahoo, Inc.™.

Figure 2:
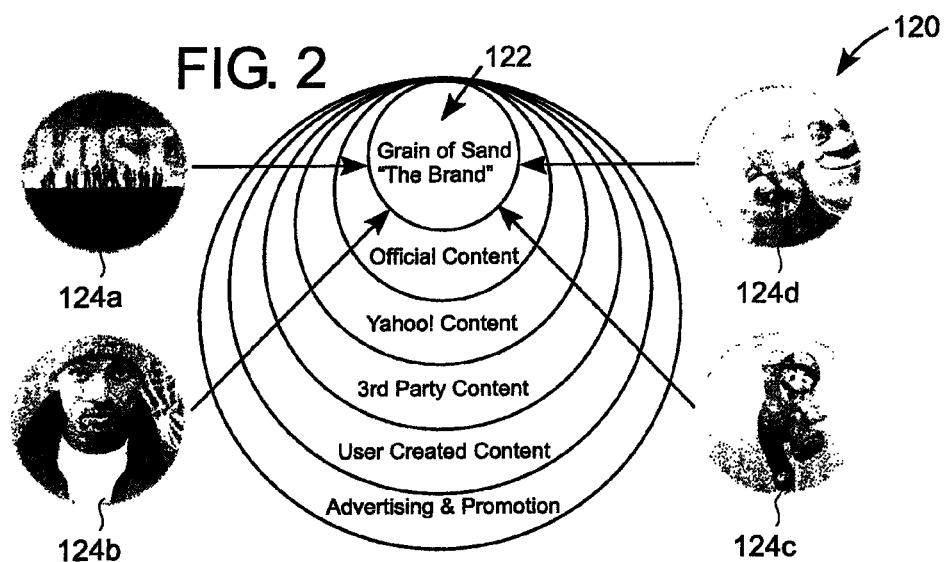
FIG. 2 illustrates layers of content that can be accessed to generate a brand site, in accordance with one embodiment.

In one embodiment, as brand universe places primacy first and foremost on the interest of the fan, the experience is always context-oriented versus category or function oriented. The brand is at the center and "build out" an experience around that brand. This is illustrated in FIG. 2, that defines a context diagram 120 for a brand 122. For each brand site or world, the context diagram 120 defines the various layers of abstraction, which all point to the brand 122. In this example, the layers include, without limitation and without restriction to ordering: (1) advertising and promotion; (2) user generated content; (3) third party content; (4) Yahoo! content; (5) official content of the brand; (6) brand content 122. For each brand site, associated with each brand, the layers of abstraction for context are applied. As shown, four brands 124 are illustrated, for which a brand site world is created. Brand site worlds are shown for: (a) a television show "LOST™" 124a, (b) actor "Will Smith" 124b; (c) "Nintendo Gaming™" 124c; and (d) the character "Shrek™" 124d.

Using the model of context diagram 120, it can be shown that an infinite variety of content and services may be built up around a core brand. However, in accordance with one embodiment, it is a goal to have the experience oriented around the subject brand versus the individual elements or other brands. This focus enables the brand site to "maintain an illusion" that the consumer is interacting with their brand, rather than utilizing a bunch of generic functions. For example, where compromises have to be made to test a new technology or to make an integration commitment, they should be made carefully and with a clear path to complete brand integration.

Major brands (e.g., products and/or services) have multiple manifestations in multiple media categories, and precise knowledge of these instances and their relationship to the brand world site (and to each other) is essential. For instance, it is not enough to know that Brand X has video games, a TV show, trading cards; but it is also essential to know each specific SKU, episode, card series, etc. This specific knowledge is preferred because it provides the basis upon which to track user interest and to drive transactions. This information also provides the mechanism where users can be made aware of additional brand related-content and services (i.e., Shrek™ 3 the movie is the entry point, but Shrek™ the brand site, incorporates the movie, the games, the merchandise, the videos, the mash ups, etc. and the Shrek™ community).

Thus, all accessible instances of the brand "roll up" (i.e., connect) to the "brand site", but the brand site is larger than the sum of its parts, as it offers the opportunity for fans to go beyond the tangible manifestations to the idealized, theoretical "essence" of the brand. For instance, Nintendo's™ "Mario™", shown as a brand site 124c of FIG. 2, may exist in many specific games, but the idea of Mario™ is bigger than any single game or group of games, and in fact has its own unique qualities in the mind of individual fans. The Brand universe system is working at its very best when it offer experiences and tools that allow fans to transcend the specific and move into the idealized or expanded concept of the brand via interaction with the system and with each other.

Because brand universe is configured to function 24/7, and with or without the help of the brand owner, the system is designed to generate a steady stream of high quality fan content. This stream, fed by the passion and creativity of the fan base, is one facet which "fills in the gaps" between traditional fan/brand transactions. As a result, fan content must not be treated as an afterthought of throwaway add on, but instead as the "star of the show". Therefore careful thought and attention is given to the "pull" components which generate the content and the "push" components which identify the best, and subsequently promote that content, both within the Yahoo™ Inc. environment and outside, via portable representations and viral components.

Specific reference is made to Yahoo's™ content, but it should be understood that the content can be managed by other entities, such as media companies, Internet companies, combinations of media and internet companies, and the like. Thus, although the brand universe system makes use of the media content already managed by sites within Yahoo™ Inc., these content sites should be viewed only as exemplary, as the system can well function when supported by other entities.

In one embodiment, it is important to have a correct sense of scale when pulling content from fans. To manage this, certain levels of interaction at the "instance" level are provided. For instance, the system will provide one set of interactions at Star Wars™ Episode 1™ HD-DVD; another for Star Wars™, Episode 1™; another for Star Wars™, the Original Trilogy™; another for Star Wars™, and another for Lucas Film™, and another for Chewbacca™ or Hans Solo™. Thus, the brand universe system is designed to precisely invoke fan content when it is most effective to the overall brand site. Effectiveness can be monitored based on user interaction or can be judged based on past performance on individual sites or on other brand sites.

Most interfaces around entertainment media objects throw an incredible number of choices at the user, usually in the form of countless tabs, links and promo boxes. A brand world site defined by the Brand universe system offers a simpler approach. Each interaction is carefully optimized to deliver the best possible user experience given what is known about the users needs, eliminating extraneous information and navigation in the process. At every step of the way, the brand universe system offers a "best guess" at the consumer's next need and makes that best guess obvious and inviting to the user via a large, highly visible promotion. By narrowing the "next step" invitation in this way, more time and effort is placed on this spot on the site. The brand universe system will therefore enable testing and tracking to fully understand the relationship between an offer and its context, in terms of generating user response.

In one embodiment, the interfaces provided by the brand universe system take the users' previous visits into account and will generate an appropriate reaction. Thus, the same content is not blindly promoted to the user and instead, by looking at what the user has already done and what has happened since they last visited, a best guess promotion is placed in front of them, to thus promote what they will want to do next. These are informed, personal guess—not just a list of most popular or most recent items, or items that strike the fancy of a human editor. The best guess promotion can be incorporated into each page of the brand site, not just top level pages, thus providing a full and rich interactive experience to the fan of the brand.

In one aspect of the system, the scale of promotion is responsive to individual tastes and visit histories. To fully customize the experience, the brand universe system defines creative page placement of content, which is auto generated. Promotional auto generation happens naturally through the addition of content, through the identification of content as particularly good or relevant, or in response to a marketing spend. The promotional engine is automated—creating units and placements on-the-fly as new material becomes available. The system also drives the inclusion of a specific sampling component that puts its own assumptions and biases to the test—giving new material a chance to be successful in "limited release"—and aids in early detection against new consumer trends.

The promotional system of brand universe is configured in an automated manner, but the system will enable human "overrides". Human overrides are important, as the system can grow and change in an automatic manner, as content data changes. However, promotion data can be added, changed, tracked and optimized continuously (e.g., daily, real-time, etc.). The promotion data can be provided by brand owners, brand fans, advertisers that see a possible link between their products or services and the brand or the brand's demographics.

The brand universe system, by its created brand sites can expose users to new brands that they might be interested in, but might have forgotten or not known about in the first place. The brand universe system is configured to do this naturally and on demand in response to partnerships with brand owners who want to create a higher level of visibility for their brands by "injecting" them into the system.

In one embodiment, and as a result, most promotional areas can contain a mix of paid and non-paid (i.e. best guess) promotion, though neither will be necessarily marked as such, particularly where endemic brands are concerned. One aspect of particular benefit to the brand site (generated by the Brand universe system) is that the mix between paid and non-paid placement is substantially balanced at all times. The user on a brand site should not notice or think anything is "wrong" (or forced on them) when an endemic brand is promoted for revenue related reasons. Thus, the integrate is natural, seamless, and more effective than simply placing a disjointed ad in front of a user. In one embodiment, all paid, endemic, non-media brand promotion in these mixed areas will keep users within the site, versus sending users to other sites (i.e. the user does not click on something that looks like an internal link and end up on an external site).

In one aspect of the invention, the brand universe system, for particular brand sites, can encompasses all entertainment brands and sub brands. From a promotional point of view, all brands are not created equal. Some will appeal disproportionately to certain segments of society, and where those segments are desired the Brand universe system places special automated emphasis. That is, the brand universe system self-adjusts to provide content on particular brand sites which best mesh with the expected demographic. By doing this, a brand universe site will be an inviting place to visit for users of the brand and the users can be best converted into more passionate fans. When users become fans, and the content is provided based on their likes, each brand site can market its content to enable maximum usage and maximum opportunities for revenue generation.

As activity is tracked, it is possible to know with great specificity what is hot at any moment in time relating to a given brand, for subsequent adjustment of a brand site by the brand universe system. In one embodiment, this information is fed to special programming sites (e.g., Inside Y! programming) so that it always reflects this specific knowledge, versus general promotional categories. For example, if someone types "Scarlett Johannson", the return should be the best option at that moment—i.e. "Scarlett Johannson in red at the Oscars™"—versus the generic "images, news, videos, etc." The search result should have the energy and the vitality of the moment vs. the dead feel of a reference book, so that the most relevant and up to the minute result is presented. This functionality, again, will turn users of the brand into fans.

Programming by the brand universe system takes time of day into account. The time of day should subtlety permeate the interface as well as the programming choices that are made. For example, after school, kid-friendly brands are emphasized while as the night goes on, brands with a mature nature may be more freely promoted.

Users influence the material programmed to them by implicit and explicit activity. The brand universe system offers users a chance to identify themselves as a "fan" of whatever they are looking at, be it a brand, an instance, or another user. In one embodiment, once they declare themselves as a fan of something, content deriving from that thing should "bubble up" to the top of their experience within the brand site.

As has already been mentioned, the brand universe system also tracks where a user goes and intelligently uses that information to make programming choices. For instance, a user that regularly uses movies Resident Evil™, Silent Hill™, and Alone in the Dark™ is clearly a fan of survival horror, so when a new franchise in this genre is created, the system will let him know. Knowledge of the user lets the system use programming to "sow seeds on fertile ground" connecting users to relevant brands rather than relying on sheer volume and brute force.

The mix of explicit and implicit inputs is designed to create a situation where a user is constantly surrounded by brands—some trusty old favorites, some of the hot new passions of the day, and others just coming up on the horizon; all moving together in orbit around the user to create a dynamic and totally personalized experience, as illustrated below.

The brand universe system provides several reporting concepts, in accordance with one embodiment. For example, brand level reporting is provided. The fundamental level of reporting is at the user/brand level. In one embodiment, every single discreet user interaction with a brand is recorded. These include but are not limited to: Visit, Pages viewed/editorial content consumed, Video streamed/uploaded, Files (image, flash, mp3, other) downloaded/uploaded, Prices checked, Contributions, answers, ratings, reviews, comments, postings, searches, etc. In a further aspect, the demographic profile of the user accrues to the brand during any interaction, thus creating a dynamic demo profile for each brand and for each interaction.

In still another embodiment, all activity needs to be viewed at the smallest instance level. For example, at the instance level of the DVD for Lord of the Rings™, which SKU (DVD Entity) generated the most activity, and within that SKU the content that generated the most activity with each segment, etc. For instance, I should know that in Lord of the Rings™: The Fellowship of the Ring area, males ages 18-22 are a particularly hot segment, but where fan art around that concept is concerned, the target age drops to 14-16. This data feeds our content acquisition engine. This also tells us what our "best offer" is at the instance and Inside Y! level.

In one embodiment, the brand universe system is configured to systematically identify up and coming brands. There are three ways in which this is done. First, whenever a new brand or instance of a brand is announced, the brand is tracked, months or even years ahead of its release. In this manner, it is known from the beginning and throughout the development cycle, how it is stacking up relative to other brands. Second, the programming system is continually sampling new items. Any major blips in activity, increased sampling, and pending sustained response may trigger an alert system. Thirdly, wherever possible, search must be mapped into the brand world so that it is possible to know exactly what users are looking for.

In one embodiment, all brand activity must be totally transparent in a relevant manner to each constituency of the ecosystem. Consumers see the impact of brand activity in places such as top 10 lists, and in the programming they receive. Brand owners see the activity through widgets and real time reports that let them know how their products or services are positively impacted by the brand site. Other interested parties, such as retailers, analysts, licensees, etc. see their own version of the data.

The content creator (whether user or brand owner) may opt to buy, at the time of upload, a promotional package that will increase the visibility of their content. They may also do this in a systematic way by striking a larger relationship with the ad sales team which would "build in" promotion for a certain number of their assets, whenever they are available. Furthermore, a real-time reporting system will enhance the sense of excitement by demonstrating usage of the asset as it occurs, and providing a sense of the immediate impact of pulling a promotional lever.

Figure 3A:
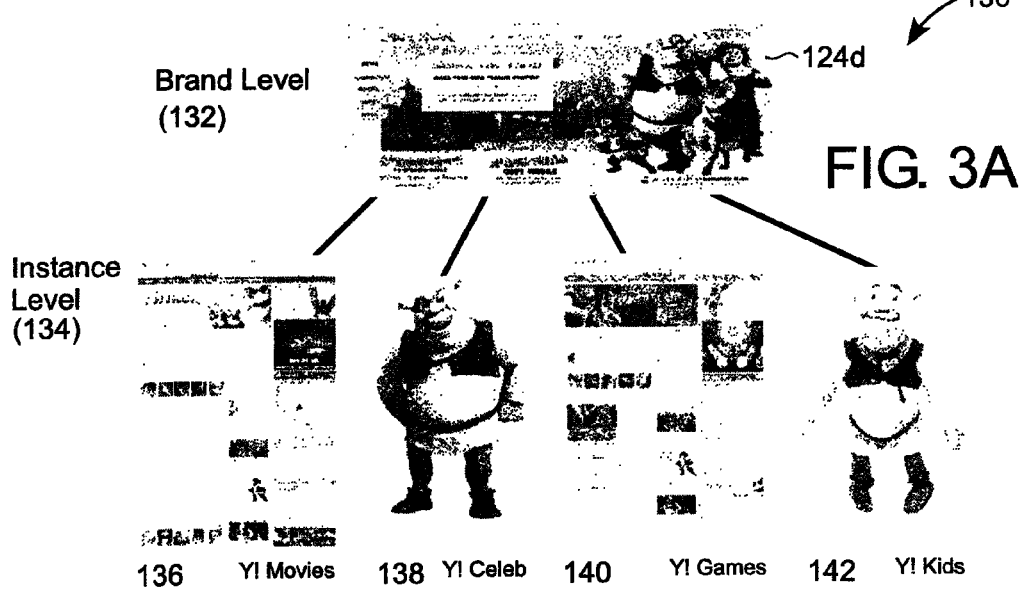
FIG. 3A illustrates an example brand site, which accesses instances of brand content from separate websites, in accordance with one embodiment.

The brand universe system 130 is, in part, built from instance levels as shown in FIG. 3A. In accordance with one embodiment, the instance levels 134 are accessed for their content and fed to a brand level 132, that defines a brand site for Shrek™ 124d, as noted in FIG. 2.

Specific instance levels 134, already having brand content, can be tapped to define a richer and more immediate experience at the brand site. The instance levels are also referred to as "verticals". The verticals are, on their own, separate websites that target a type of media. The type of media may be movies, games, etc, as noted in detail below. These separate websites therefore contain content for more than one brand, so long as the content is somewhat related to the media type. The brand content present on the separate websites, will therefore be referred to as instances, and such instances (i.e., brand content) can be shared with particular brand sites. The instances of the brand content, in one embodiment, will be present on both the separate website and on the brand sites, and any change to either one, may be synchronized.

The verticals should offer a best-on-the-internet experience around any particular instance of the Brand. If a user comes to Y! Movies 136 looking for info on Shrek™ 3, then the user will find it there, just as the will for Shrek™ Video Games within Y! Games 140. However, from either of these specific instances, the user may be invited to step into a Shrek™ "World" (e.g., the brand level 132) where Shrek™ is represented across instances. Once a user has taken a step out of the vertical (instance level 132) and into the world (brand level 132), all subsequent activity takes place within the world context, vs. the vertical (though the information is the same in both). Other illustrated verticals include Y! Celeb 138, Y! Games™ 140, Y! Kids™ 142, etc. Again, although the verticals are those provided by Yahoo Inc., the verticals can be provided by any media company or individual. In one embodiment, where a brand exists in a single category, then the "world" becomes the page within the vertical for that Brand. Still with this example, the TV show "Heroes™" only exists within Y! TV™, until such time as it branches out into other brands like video games, toys, etc.

In one embodiment and with reference to FIG. 3A, each instance of Shrek™ as represented in the verticals is "aware" that it is a part of the larger "Shrek™", concept, and thus, when a promotion occurs that is related to Shrek™ it can instantly populate across all related pages on all verticals with one command. This aspect is beneficial to promoting "micro" events because it touches every consumer that makes sense with minimal programming effort.

Beyond standard use cases, the brand universe system is designed to add an emotional edge. For instance: (1) Fan has five minutes to spend, what have we got? (2) Fan wants to extend that kick he gets from his favorite character on his favorite show, how does he do it? (3) Fan wants to be "on the inside" and "first" to see that new trailer, how do we make it happen? (4) Fans wants to "hang out" and relax with other fans, how do we enable it? (5) Fan wants to be recognized as a top notch fan, etc. (6) Fans want to make their brand a simultaneous communal experience, how can we make this happen? (7) Fans want to create their own ending to a movie, etc. Thus, the brand universe system meets a fan's emotional need and defines a connection with the brand, in addition to a functional need for information or services.

Still further, the brand universe system is configured with functionality to identify and recognize key brand site contributors. This feature is facilitated by providing greater access to tools and control over content on site, and by providing identifiers that set them apart from other members of the community. For example, being a "Level 10" member of the community or a "Lead Editor" of a show or a "#1 fan" of a particular brand. This leveling should reflect both explicit and implicit contributions to the site. The brand universe system also allows third-parties to log in and directly publish content to the site. Security is provided to ensure the right level of access is granted to the right user.

II. System Management, Content Sharing and Content Contribution

Figure 3B:
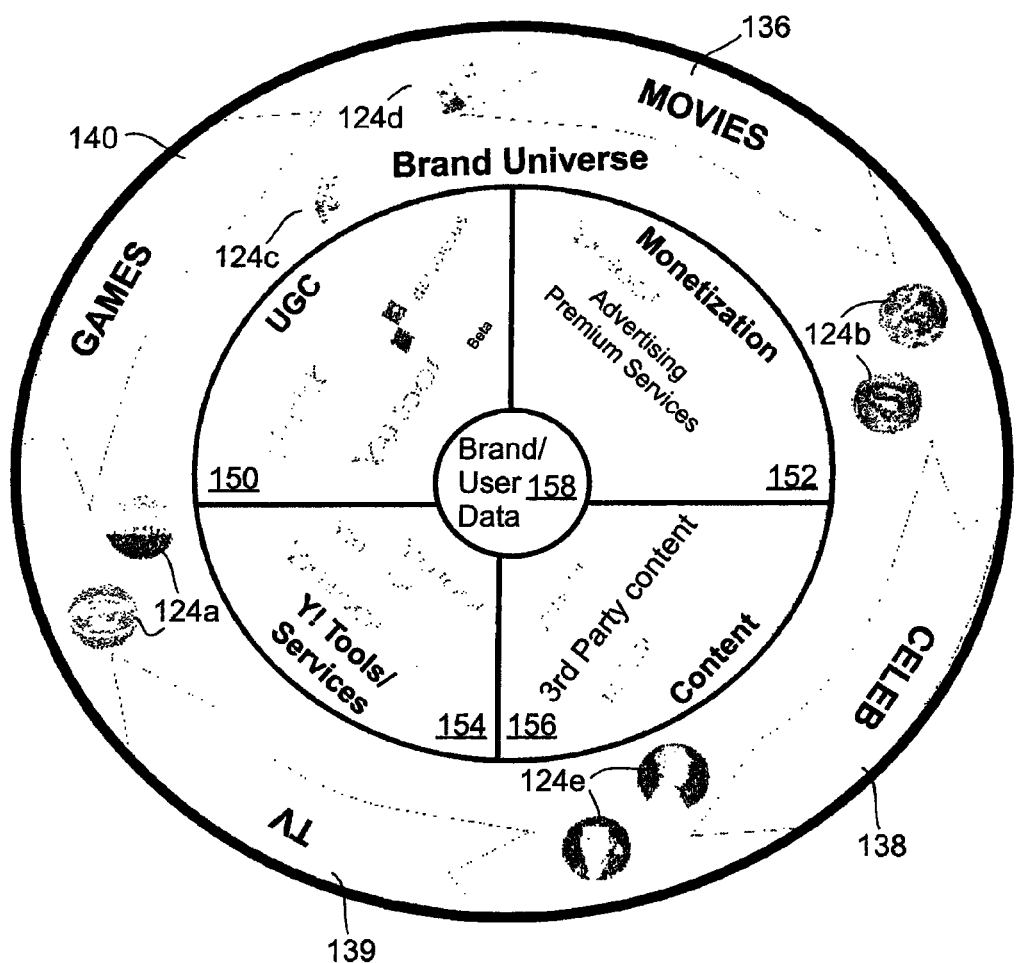
FIG. 3B illustrates an example of content that may be accessed to generate a brand site, in accordance with one embodiment.

FIG. 3B illustrates a brand universe system that feeds from disparate content providers, which also contain and manage content related to the specific brand. The specific brand is illustrated by brand/user data 158 cell at the center of the brand universe. One level of farming for content (related to each brand) may occur from instance levels (e.g., verticals), that in this example, are managed by Yahoo™ Inc. Of course, other separate websites, managed by other entities will work. Examples include: (A) user generated content (UGC), such as Flickr™ data, del.icio.us, Yahoo 360™, etc.; (B) Yahoo tools and Services, such as Yahoo Messenger™, Yahoo Search™; (C) Monetization, such as Yahoo Shopping™, Advertising, and Premium Services; (D) Content, such as Yahoo News™, 3rd Party Content (e.g., current event data, RSS feeds), Yahoo Entertainment™, etc. This list was provided to give an overall flavor of the various data content sources and their function, and should not be restrictive, as they were provided for example purposes only.

Example brand sites are shown in FIG. 3B, namely television shows "LOST™" or "American Idol™" 124a, (b) celebrities "Tom Cruise™" and "Paris Hilton™" 124e; (c) "Nintendo Gaming™" 124c; (d) the movie character "Shrek™" 124d; (e) Action Heroes™ 124b, etc. These brand sites, as noted above, will also feed in brand content data from the various vertical sites (e.g., to obtain brand content instances (levels 134)). Example vertical sites may include, Movies™ 136, Celebs 138, TV 139, Games 140, etc. The brand sites, although they will share content with verticals, the brand site will provide a more complete brand world, as the brand sites pull (roll up) data from the various instance levels, while also integrating user data, user generated content, brand-centric user experiences, brand-related chat, brand merchandising, etc., to define the brand/user data 158 experience.

Figure 4:
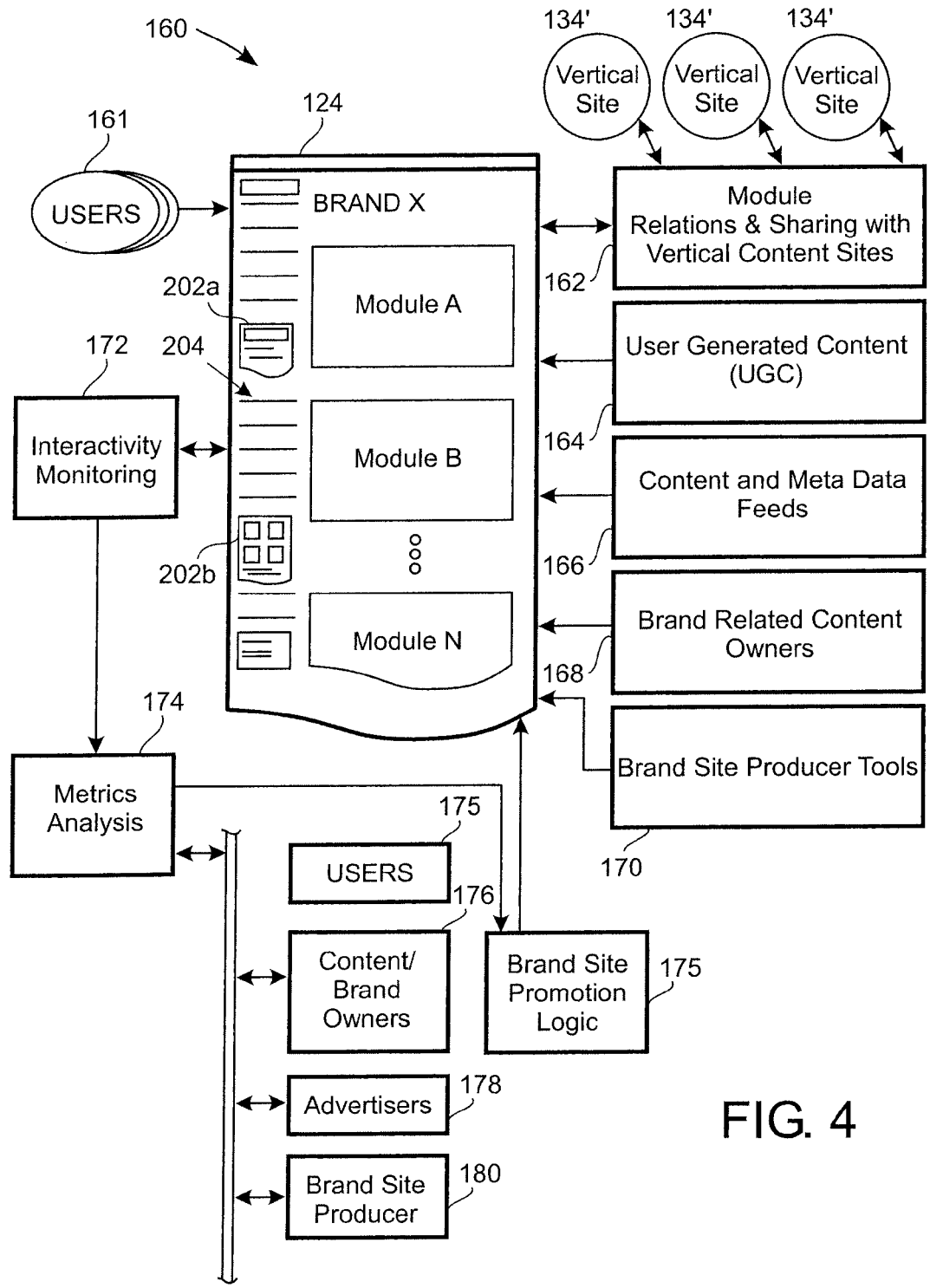
FIG. 4 illustrates a system diagram of the brand site components and modules, in accordance with one embodiment.

FIG. 4 illustrates a system diagram 160, in accordance with one embodiment of the present invention. System diagram 160 illustrates a brand site 124 that includes a number of components that make up the brand site 124, when implemented in accordance with one embodiment of the present invention. The brand site 124 is for Brand X, and the brand site is organized, in one embodiment, to include a plurality of modules. The plurality of modules are shown as module A, module B, . . . module N. In one embodiment, module definition and programming will simplify their integration into the brand site, so that APIs and pluggability enable fast and efficient publication and edits of new content, submission of new content, and overall management of the brand site content. In addition to the modules, the brand site 124 may include a number of other feathers such as advertisements 202a, user generated content 202b, and other images, icons, menus, or interactive features, in addition to text 204.

The various components provided around the modules of the brand site 124 are designed to seamlessly blend into the presented content that is brand-specific and targeted to the specific demographic for the given brand being rendered at the brand site 124. The brand site 124 is accessed by users 161 over the internet, and users 161 will be able to access the brand site 124 from any number of connected devices. The connected devices can include desktop computers, laptops, mobile devices, cell phones, personal digital assistants (PDAs), and any other device that is capable of accessing the content provided by the brand site 124. The various users 161 access brand site X at their convenience, and may also personalize their brand X site for their enjoyment or normal use habits.

In one embodiment, brand X site is also provided with a log-in module to enable a user to login with a user name and password to then access the modules of brand X, in a user defined presentation, that is most preferable to the specific user. Accordingly, the brand site 124 not only provides the dynamic information in a pre-defined format, but the format can also be rearranged and prioritized depending on the preferences of the specific users that may log into the brand site 124. Depending on user interactivity with the brand site 124 and the different modules of the brand site, the system 160 is configured to provide interactivity monitoring 172, that saves data regarding the monitoring to the metrics analysis 174 module.

The interactivity monitoring 172 is configured to monitor specific user's activity on the brand site 124 to capture preferences, user demographics, most frequently used content, identify when user generated content is supplied by the users, and navigational activity within the brand site 124. All of these metrics are provided to various components of the system 160. The system 160 is shown to provide access to the metrics analysis 174 to users 175. Users may access the metrics directly through the brand site 124 by way of displays that indicate popularity of specific modules, components within the modules, or recently viewed data by other users 161.

Additionally, metrics analysis may be provided for specific content parts managed by the brand owners 176. In this manner, metrics can be provided in a more granular manner, so that very specific brand content can be individually monitored, tracked, updated, changed, or eliminated, based on one or more decision factors. Such factors may be due to business reasons or user satisfaction or user dissatisfaction.

The brand owners noticing specific activity on the brand site 124, may find a need to develop additional modules for the brand site 124, modify the products or services rendered by the brand site 124, or introduce new promotions for the brand products or services. The brand owners would therefore get a substantially real-time view into the popularity of their specific brand, and could provide a viewpoint into desired functionality, or desired services that may be missing on the brand site 124, to thus provide additional monetization to the brand owner 176 (e.g., by selling (i.e., through e-commerce or non-ecommerce traditional store transactions) brand content services or products, or services or products advertised on the brand site). The metrics analysis 174 is also shown available to advertisers 178. Advertisers 178 desiring to inject their content into a particular brand site 124 would be provided with metrics that identify the popularity of the brand and other related advertising services or products.

For instance, if soft drinks are being advertised in a seamless manner in one of the modules of the particular brand site that related to sports, other drink type advertisers may see an advantage to also providing similar seamless-type advertising modules for the given brand site. The metrics could also provide data regarding access by users, susceptibility of users to access the specific advertisements, revenue generated by previous advertisers, and other metrics similarly usable by advertising companies. The system 160 could also provide access to brand site producers 180. The brand site producers 180 are individuals that manage the structure parts of the brand site 124, certain placement of modules within the brand site 124 (if promotion packages are paid), the organization of data, and the feed of some data in and out of the brand site 124.

By providing brand site producers access to metrics analysis 174, it is possible for the brand site producers to more fully understand the use and interactivity being experienced by users, and could also provide insights into improvements to further integrated the modules of the brand site 124 in a more seamless, or interactive manner. The metrics analysis 174 is also shown providing information to a brand site promotion logic block 175. Brand site promotion logic 175 is designed to intelligently read the metrics analysis 174, apply rules to improve promotions of specific items within the brand site 124, and in an automated manner, promote certain content within the brand site 124 to a more prominent role, or demote certain content either to less prominent roles. Additionally, the complete removal from the brand site may occur, depending on the user interactivity, and other metric analysis performed on the usefulness of the brand site 124.

Continuing with FIG. 4, the system 160 is also shown to include a block 162 that defines module relations and sharing with vertical content sites. Module 162 is designed to feed the brand site 124 with specific modules that may be obtained or shared with vertical sites 134'. As noted above, vertical sites may include other separate sites that share the content found on the brand site 124, and any changes made in either the brand site 124 or the vertical sites 134' may be seamlessly integrated and synchronized in relation to the features being shared. A block 164 is also shown providing user generated content (UGC). User generated content is that which is produced by users 161 and uploaded to the brand site 124. The user generated content may be simple feedback information provided by forms, menus, ratings, or actual interactive content (videos, pictures, data) produced by users and submitted for publication into the brand site 124.

Block 166 shows content and meta-data feeds that are also provided to the brand site 124. The content can include content found from third parties, such as user organizations, meta-data regarding those different pieces of content, and the like. By providing block 166 as an input to the brand site 124, the brand site 124 will appear to be receiving the most up-to-date information regarding the brand X. Block 168 provides brand related content owners access to portions of the brand site 124. Brand related content owners may be those which provide content that is not specifically about the brand, but is very related to the brand and thus can be provided to the brand site 124 for tight integration.

Figure 9:
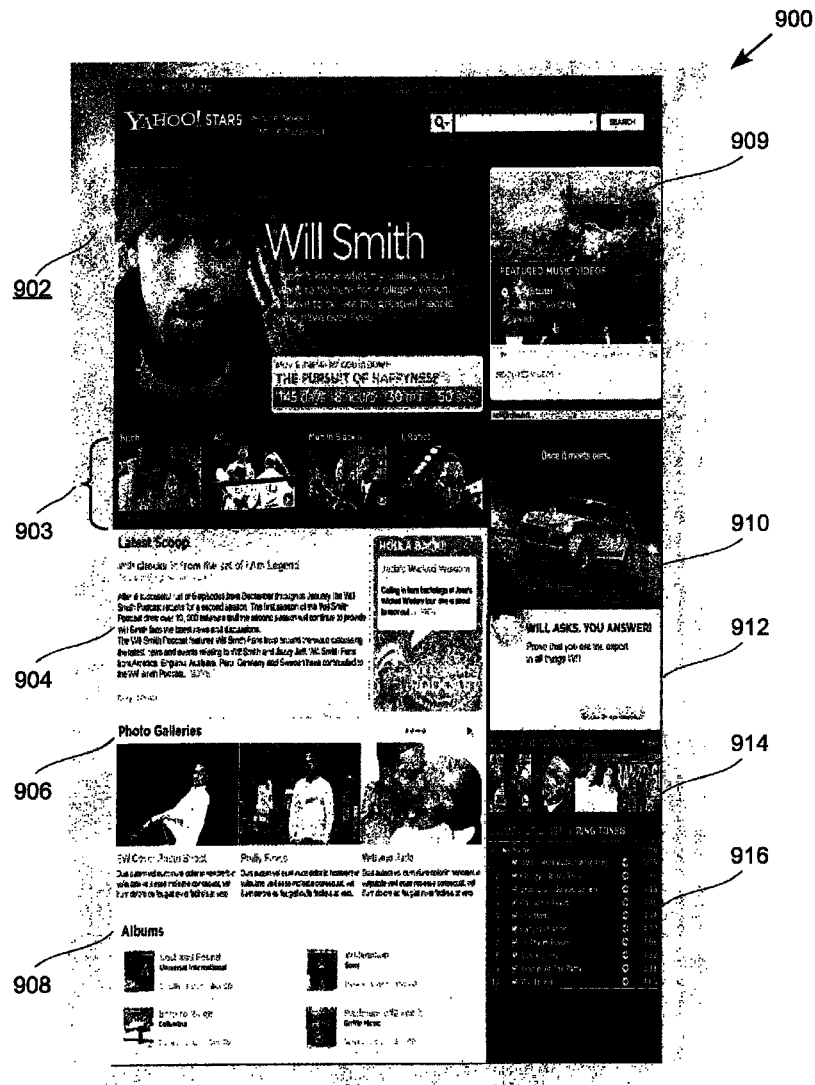
FIG. 9 illustrates a brand "persona" that is used to generate a brand site, in accordance with one embodiment.

As will be shown in FIG. 9, a brand-related content owner 168 may be the owner of the ringtones shown in the bottom right hand corner of screen 900. Although the brand owner (or persona-subject) in screen shot 900 of FIG. 9 is Will Smith™, the ringtones are not necessarily owned by Will Smith™, but they are considered brand-related content, and it is owned by specific companies that would like to provide such content to Will Smith's™ brand site 900. Next, is a brand site producer tool 170 block that provides brand site producers access to the brand site 124 to perform modifications, updates, retooling, and any other adjustments or updates that may be necessary in view of its structure, content, or organization.

FIG. 5A illustrates a system view diagram 160' for the brand universe system, in accordance with one embodiment of the present invention. The system view diagram 160' defines an entertainment content repository (ECR) 240 for holding data related to various brand sites. The ECR 240 will therefore store in a plurality of databases information regarding different brands, assets, relationships, meta-data, and other information that will link specific brand sites to the various components for obtaining the content and for presenting the content to users. In this example, the ECR 240 is shown interfaced with services 220.

Services 220 are shown to include, in this example, personalization 222, promotions 224, services interfaces 226, advertising 228, analytics 230, and Yahoo™ network services 232. These services 220 therefore provide the ECR 240 with access to brand-centric experiences in vertical worlds defined in an instance level 134. As noted above, the instance level 134 can include various sites that hold data regarding the specific brand site being created, managed and interfaced to the ECR 240. In the example shown, vertical sites include Yahoo games 140, Yahoo movies 136, Yahoo TV 139, Yahoo kids 142, Yahoo celebs 138, etc. The resulting example brand site 124d is the brand universe site for Shrek™, in this example.

The world for Shrek™ shown by the brand site 124d is the brand level 132, as previously discussed with reference to FIG. 3A. The brand site 124 is also illustrated by an icon in the ECR, as the brand site 124 stores information regarding the brand site 124d, as well as brand content instances 142, 138, which may be obtained from different vertical sites, mentioned above. Data related to different brand sites 124a, 124b, are also similarly stored in the ECR 240, for access by the various processing engines of the brand site universe system 160', in accordance with one embodiment of the present invention.

The ECR 240 is also shown to receive content 252 from various third party data feeds 254. The third party data feeds 254 can provide information such as TV guide information, gaming information, movie information, and thus populate that information to the ECR 240 as it relates to the specific brand sites with the ECR 240. The content 252 is, as noted above, added and managed by producer tools 242. The producer tools 242 can be managed by brand site producers 244. The brand site producers 244 may be charged with the organization, orientation, content, and placement of the various modules within specific worlds (brand sites). Interfacing with the ECR 240 is an internal recording block 250 and a partner dashboard 248.

Partner users and brand site managers 246 can therefore gain access to the various components and interfaces that communicate with the ECR 240. For instance, a partner dashboard 248 (e.g., user interface that is user accessible over the web) will allow advertisers or owners of specific brands marketed, displayed, or highlighted by brand sites to view the performance of brand sites, the various modules on those brand sites, or content on the specific brands based on user interactivity with the site. Internal reporting 250 will also allow brand site managers to make adjustments to the brand sites, depending on the performance as monitored by user interactivity, feedback and other metrics.

Figure 5B:
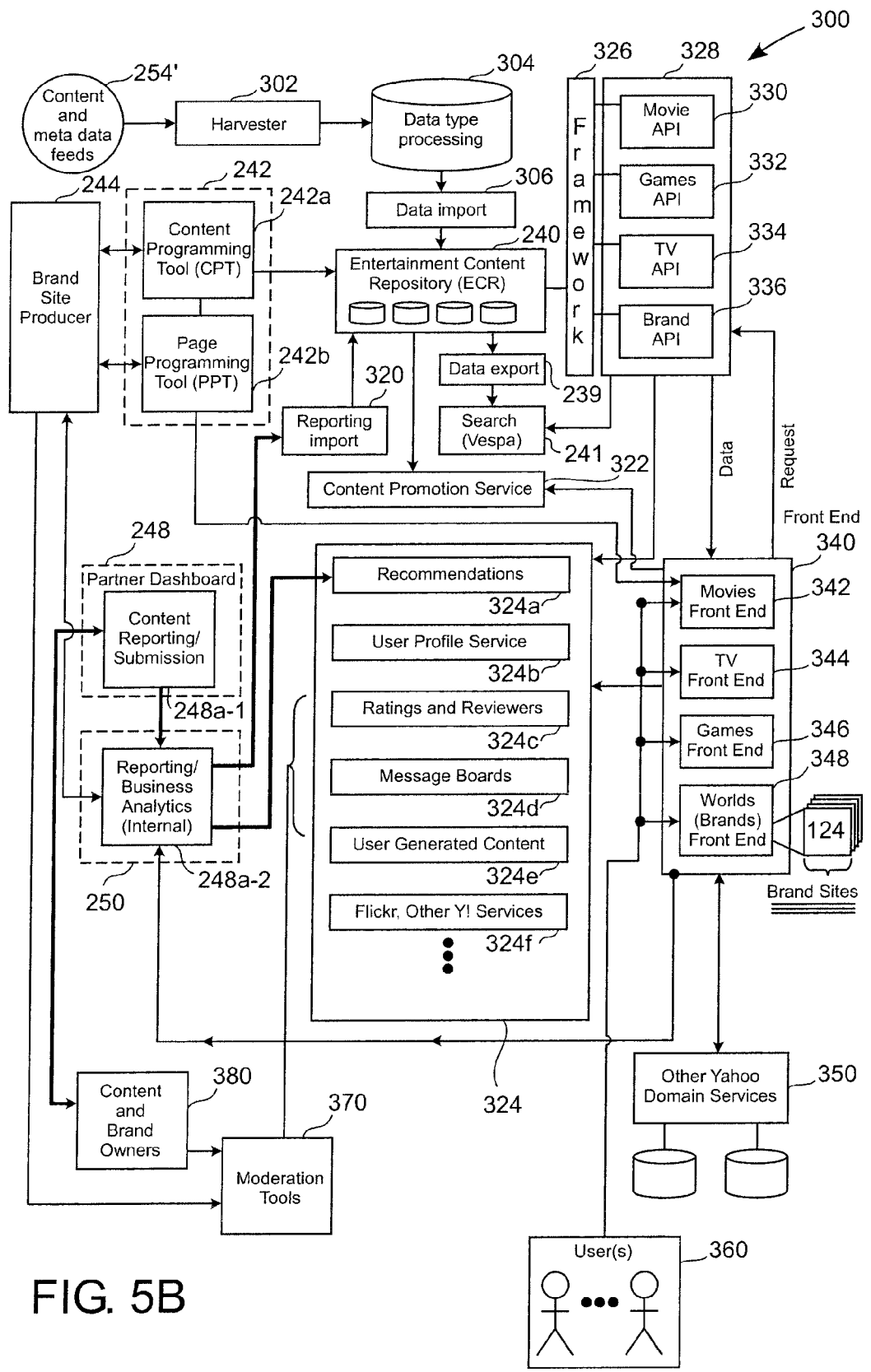
FIG. 5B illustrates a more detailed diagram of a system that manages access and data for generation of brand sites, in accordance with one embodiment.

FIG. 5B illustrates a brand universe system 300, defining additional aspects of content acquisition, content management, reporting, and presentation for brand sites, in accordance with one embodiment of the present invention. The entertainment content repository (ECR) 240 is shown receiving data from various components. One component is content and meta-data feeds 254'. The content and meta-data feeds may include user feeds and other data that is then forwarded to a harvester 302. The harvester 302 is configured to obtain the data from various communication data source connections (e.g., HTTP, FTP, and other communication protocols ports, formats, and links) and forward that data to a data processing block 304.

The data processing block 304 will identify the different types of data such as text data, image data, meta-data, video data, and other types of data so that data can be properly forwarded to a data import block 306. Data import block 306 is configured to forward and map the different pieces of data with appropriate identifiers, tags, and meta-data to the databases of the entertainment content repository 240. The ECR 240 is also interfaced with framework 326 that is coupled to API blocks 328. Example API blocks 328 are shown to include, in this embodiment, movie API 330, games API 332, TV API 334, and brand API 336. These APIs are configured to provide access to the different vertical instances (on the separate websites) where components of the brand are shared and obtained between the vertical sites and the brand sites managed by the brand universe system 300.

In this example, front end 340 is provided to enable users to gain access to the different vertical sites, such as the movies front end 342, the TV front end 344, the games front end 336, and the various worlds front ends 348 (brand sites). As illustrated, brand sites 124 are accessed through the worlds front end 348 that then provide requests to the API blocks 328, and data is provided to the front end 334 for display and rendering on a display screen of the various users. The API block 328 may also provide a search request to the ECR 240 through a search block 241 to render search results data back to the users interfacing with the brand sites or the various vertical sites associated with front ends 342, 344, or 346. The search block 241 is a search index that is re-populated on a regular basis via a data export 239 from the ECR 240. API block 328 then hits the Search block 241 with search requests.

The front end 340 is also shown coupled to other Yahoo domain services 350 that can provide additional data and information to the brand sites 124. The users 360 will therefore interface with the screens provided by the front end 340, to cause interactive use of the various brand sites. As users 360 interface with the different brand sites, the interfacing and interactivity with the brand sites and its content are monitored. A reporting/business analytics module 248b is provided to monitor the activity of the various brand sites as used by user 360.

The reporting/business analytics module 248b is internal processing (e.g., to the operator of the brand sites), and such information that is also used by the producers of the brands sites to improve the quality of the experience for the users (i.e., that are becoming fans) of the brands, and also make adjustments based on this information. The reporting/business analytics module 248b also provides an automated data feed to the recommendations block 324a. This recommendations block 324a is a recommendations algorithm/system that interfaces with the front end 340. The reporting/business analytics 248b is part of the internal reporting 250, as discussed in reference to FIG. 5A. The reporting/business analytics module 248b can be a separate system or integrated system, that takes user interaction data and ECR 240 data as inputs, and outputs recommendations based on user data. In one embodiment, the system can be an integrated platform tool or a third party tools that interfaces with the brand universe system 300. The partner dashboard 248 includes content reporting 248a-1 and submission 248a-2.

The content reporting block 248a-1 is a read-only interface for brand owners 380 in to the reporting/business analytics module 248b. The content submission block 248a-2 is an interface where content (images, videos, etc.) and data may be submitted by content or brand owners 380 to the ECR 240. The functionality of content submission is, in one embodiment, geared to drive the content promotion service 322. Brand site producers 244 can view, edit, or approve any submissions made by the content or brand owners 380 in the content submission block 248a-2. Once approved (or it can automatically be approved depending on the brand owner 380), the content can be automatically promoted by the content promotion service 322. As used herein, "promoting content" means that the content takes on a more visible position on the interface pages, so that more user traffic migrates toward the promoted content.

Moderation tools 370 are provided to enable the content or brand owners 380 and the brand site producers 244 to moderate the type of content posted as user generated content (UGC). If the user generated content or user feedback is posted on the brand site, and such content is offensive or destructive toward the brand in any way, as judged by the brand owners or brand site producers, then that data can be removed or adjusted.

In addition to recommendations 324a, other modules with processing logic that provide functionality include user profiling services 324b (e.g., "a user's recently viewed content (e.g., such as movies, games, TV shows, video clips, photos, etc.)", "most viewed/most popular content on a site, in the last hour, 24 hours, week, month, all-time", "most viewed/most popular content by audience segment (i.e. what movies are popular for 18-24 year old females)", "ad targeting based on a user's interest profile generated from what they view over time"), ratings and reviews 324c, message boards 324d, user generated content (UGC) 324e, Flickr™ and other services 324f. In one example, the moderation tools 370 can be used to moderate content submitted through 324b-324f. These services 324 are provided to manage, submit or present data, interactive menus, graphics, and other information that may be fed back to specific brand sites in the form of modules, content data, or supporting information for the modules for presentation on the brand sites. The brand sites will therefore be able to interface directly with rich content information that is up-to-date, provides user involvement, and enables further blending of the brand with the user's experience to assist in converting users into fans of a brand site.

Producer tools 242 are also provided to enable brand site producers 244 to interact with the content in the ECR 240. The producer tools 242 include a Producer's Desktop (PD) 242a, and a content programming tool (CPT) 242b that is interactively coupled to the ECR 240. The tools of 242a and 242b are provided in the form of interactive programs and forms that enable brand site producers 244 to properly manage their brand content as it is presented to the ECR, for then publication on the brand sites 124, when users 360 access the worlds front end 348. A content promotion service 322 is also provided and is shown receiving data from the ECR 240, and then interfaced with the front end 340 to provide the brand sites 124 with instant content promotion services, so that when users 360 are viewing the brand sites, certain content can be highlighted.

The highlighted content can be promotional information that is either paid for by advertisers in the brand sites, or can be promoted to a higher prominence on the page if users desire more functionality from specific components and modules of the brand site. These and other functionalities are provided by the brand universe system 300, in accordance with one embodiment of the present invention.

Figure 5C:
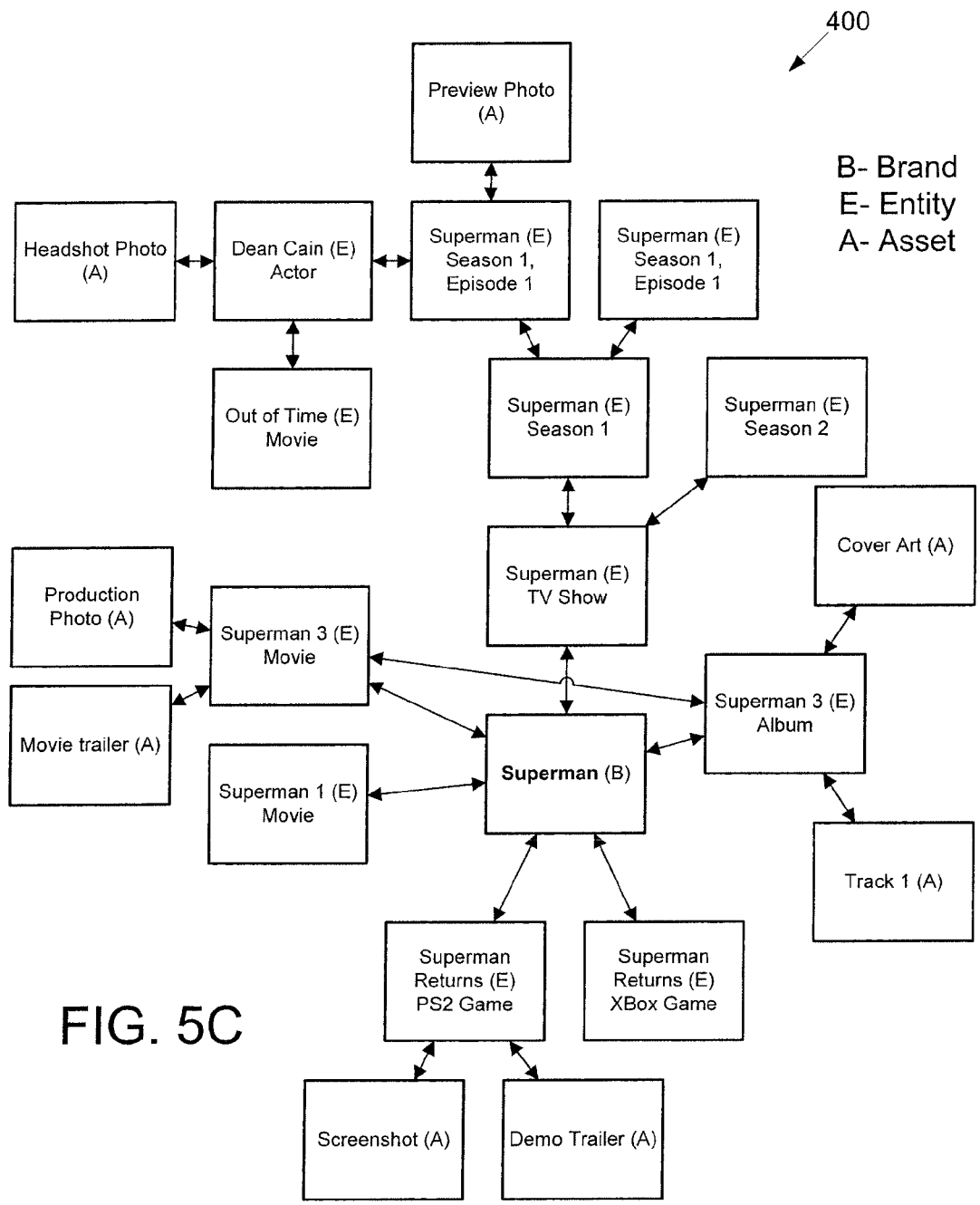
FIG. 5C illustrates a bi-directional graph of relationships, in accordance with one embodiment.

FIG. 5C illustrates a bi-directional relationships diagram 400 that defines how specific data pieces are interconnected to a specific brand to define modules or parts of modules of a brand site, based on information obtained from other sources. The bi-directional relationships diagram 400 is also referred to as web relationships that relates specific pieces of the web in terms of "degrees of separation". The graph therefore does not define a hierarchy with respect to components, but simply their inter-relationships. The various components that are interrelated and illustrated by the bi-directional relationships diagram 400 include entities identified by "E", and assets identified by "A". The brand (of the brand site) is identified as "B".

An asset is a piece of content that can be consumed such as photos, videos, new articles, and any other content that may relate to an entity. An entity is a specific person or thing that relates to the brand, and may also be related to other entities. For instance, the Superman™ TV show entity can be related to both the Superman entity season 1 and the Superman entity season 2. The Superman™ season 1 entity can also be related to other episode entities. Certain ones of the entities may also include specific assets. An example of an asset is shown as cover art or track information, which may be related to Superman ™3 album entity.

Thus, the brand "Superman™" is able to identify its relations to specific entities, and the specific entities can also be related to other entities, depending on the content of the specific entities. The bi-directional relationship diagram 400 is shown to illustrate the dynamic web that is formed when a brand site, such as a brand site for Superman, is linked to the content instances present at other entities, and related to those entities by the relationship graph. As the content grows, additional links to other entities and assets can be plugged in to the appropriate location on the bi-directional relationship graph 400. Accordingly, the web nature of the relationships enables easy interrelationships to the data so that presentation can be easily integrated into the brand sites.

Figure 5D:
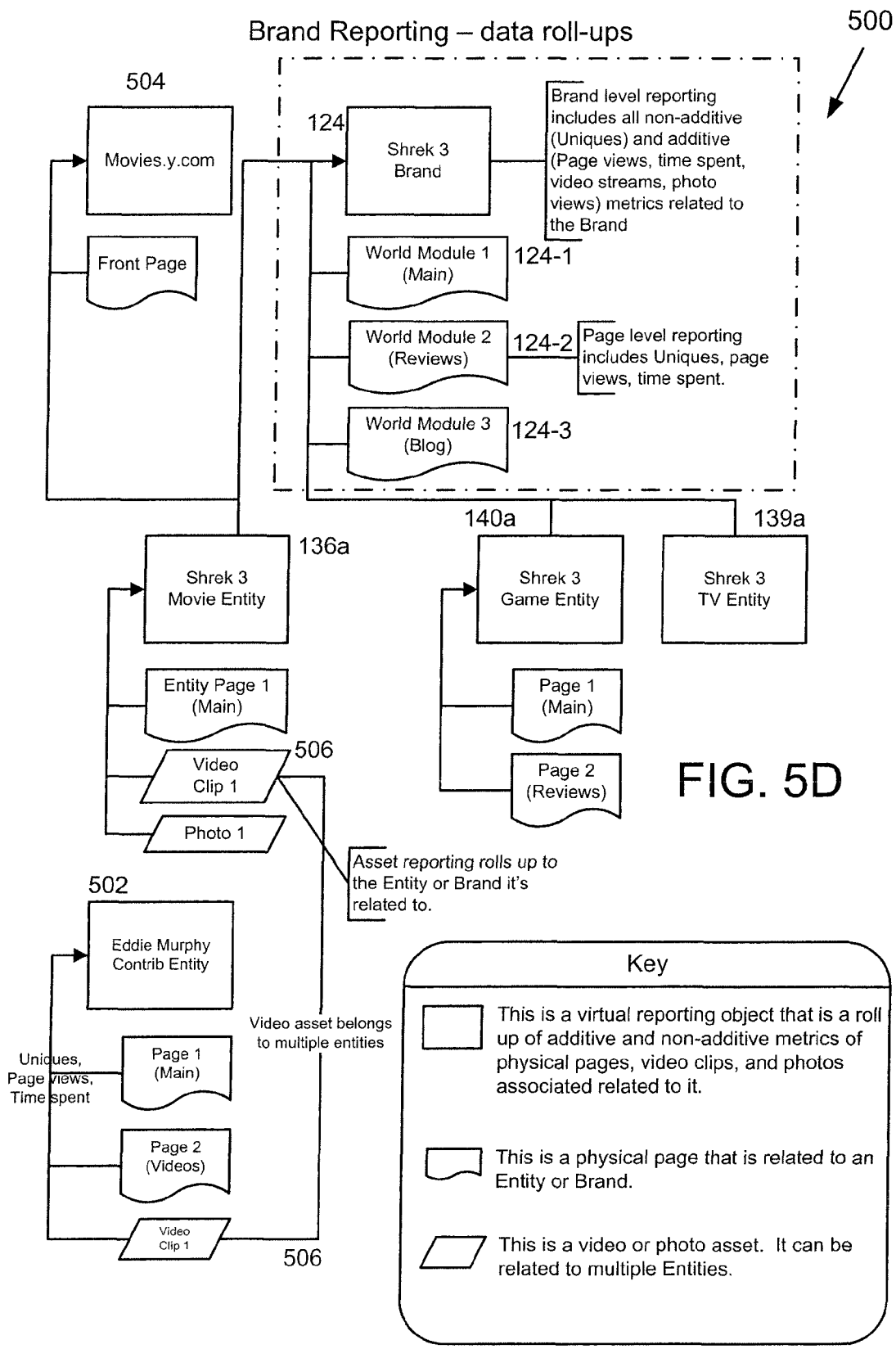
FIG. 5D illustrates related data and instances, in accordance with one embodiment.

FIG. 5D illustrates a brand reporting structure 500 for an example brand site 124. Brand site 124 is for Shrek™ 3. As noted, the brand level report includes all non-additive uniques and additive page views, time spent, video streams, photo views, metrics related to the brand, etc. As noted in the key of FIG. 5D, a square box is a virtual reporting object that is a roll-up of additive and non-additive metrics of physical pages, video clips, and photos associated to the object. The curve bottom box defines a physical page that is related to an entity or a brand. The parallelogram may define a video or a photo asset.

And, the asset can be related to multiple entities. The Shrek™ brand 124 is shown to include a number of modules 124-1, 124-2, and 124-3. 124-2 is a module-level reporting that includes uniques, module views, clicks, and time spent. Module 124-1 may be regarded as a main module, but the main module may be promoted or demoted, depending on various factors, as noted above. Module 124-3 may be a blog module that would enable users to blog (comment) about different aspects of the Shrek™ 3 brand site 124.

In this example, Shrek™ 3 the movie entity 136a, is shown directly related to Shrek™ 3 brand. Shrek™ 3 the movie entity 136a, includes an entity page 1 which is the main page for the movie entity 136a. Asset 506, which is a video clip 1, is also shown to be part of the movie entity for Shrek™ 3 136a. In addition, video clip 1 506 is also part of an asset that relates to the Eddie Murphy contribution entity 502. The Eddie Murphy contribution entity 502 may include a page 1 which is its main page, and would provide some uniques, page views, and time spent. The Shrek™ 3 game entity 140a is also shown related to the Shrek™ 3 TV entity 139a, which also relates to the Shrek™ 3 brand 124.

The Shrek™ 3 game entity 140a would include its main page and reviews. A movies entity 504 would include its own front page, and could also be related to the brand 124. In addition, the Shrek™ 3 movie entity 136a would also be related to the movies entity 504. Accordingly, an advantage of the brand universe system is its ability to tap into the content of related entities and the assets of those related entities to populate the brand site in a modular form that dynamically utilizes those assets when those assets are related and linked to the brand.

Figure 6:
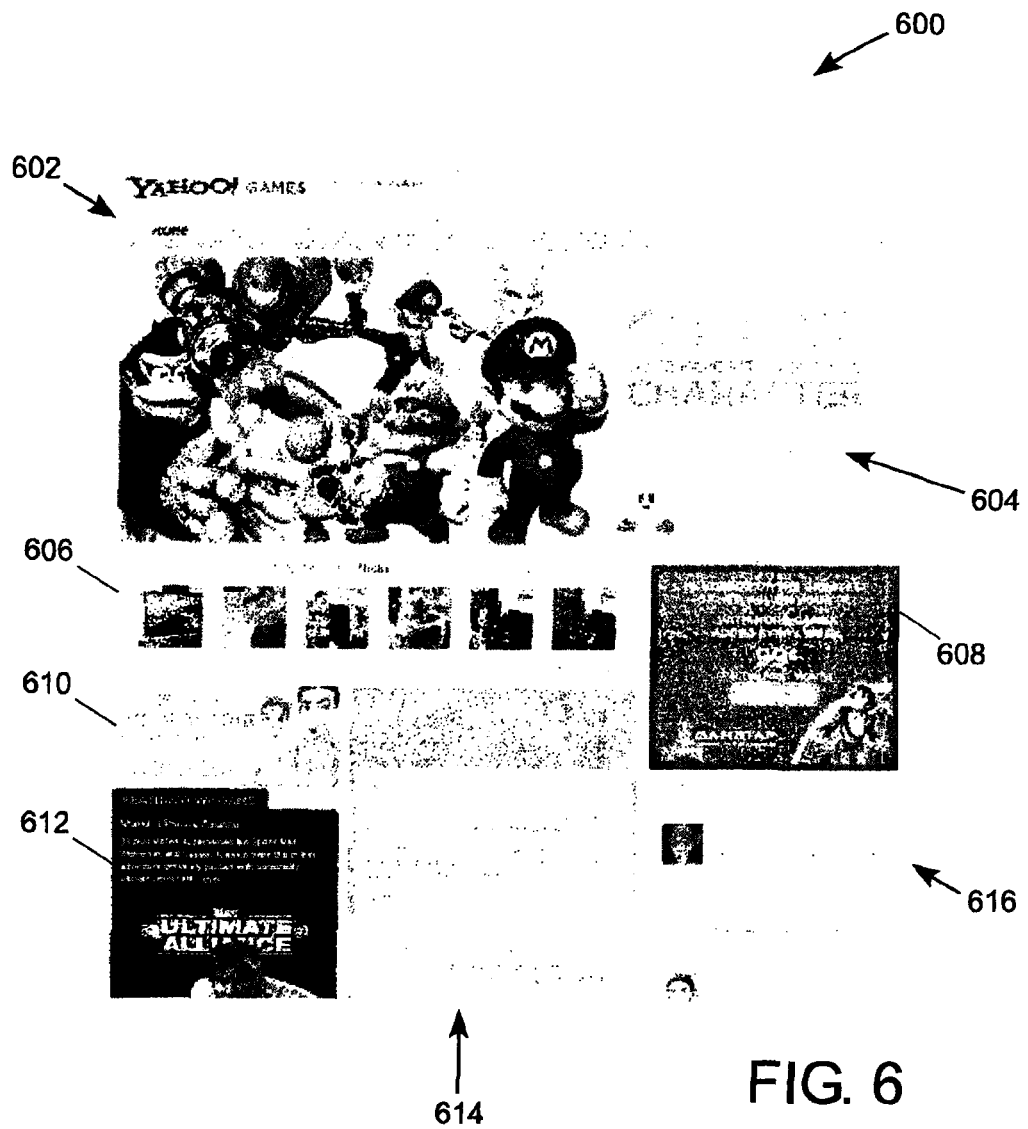
FIG. 6 illustrates an example brand site, in accordance with one embodiment.

FIG. 6 illustrates an example brand site 600, in accordance with one embodiment of the present invention. Brand site 600 is an example brand site that incorporates various entities and assets to seamlessly display the information on a brand site that links data (or shares an instance) from the various verticals and other content producing entities.

The resulting brand site 600 has a focus, in this example, around the computer gaming console brand "Wii™" by Nintendo™.

The brand owner Nintendo™ may or may not participate in the generation of the brand site 600, but brand related information from various entities, and its assets, will be seamlessly compiled and presented in module form into a seamless display that is all brand-centric to create brand fans. In this example, the highlighted module is a module called choose your favorite Nintendo™ character, and allows users to vote 604 regarding their selected favorite character. A photos module 606 is also provided to enable users to post their own photos (or view photos of others) and share experiences (in a community environment) regarding the Wii™ video game console and its applications.

By allowing users to post photographs regarding their experiences with the Wii™, the site provides a means to engage the users and give them ownership regarding the content of the brand site 600. In one embodiment, a photo capture and tagging application, such as Flickr™ (or other photo sharing and tagging site) may be used by users to capture images regarding their use of Wii™ products and games and post their photos to Flickr™ to enable upload to the Wii™ photos module 606 of FIG. 6.

Additionally shown is a module that will enable users to deck out their avatars 610, and the avatars can be decked out with Wii™-type clothing or styles. The concept of an avatar is a make-believe character that can take on a persona and be dressed or styled in a certain manner. The avatar may be owned by a user, and the user may wish to dress the avatar or provide the avatar with Wii™-type equipment, clothing, or the like. The module 610 although relates generically to avatars, its integration into the brand site 600 is brand-related due to the ability of the decking out avatars with Wii™-type products and services, and thus, is related as an entity and possibly an asset to the brand site 600.

Feature games module 612 also provides a link to a games vertical site that feeds 612 (or provides access to an instance of the same brand content), into the brand site due to its relationship, and also may exist at the vertical site at the same time. An advertisement 608 is integrally placed within the brand site 600 and provides relationship to the content of the brand site. Advertisement 608 relates to gaming and users viewing this gaming information on a brand site 600 related to the Wii™ gaming console would view the advertisement information with relevance as opposed to distraction, as is common in other sites that advertise unrelated goods and services to the content of a page. Module 614 provides Wii™ links around the world.

In this example, module 614 is a dynamic link portal that identifies websites that have been tagged as relating to the Wii™ product or service. For example, a service called delicious (del.icio.us™) is a program site that allows users to tag certain web pages and sites, and then search the web for web pages and sites that have been tagged with certain tag identifiers. In this manner, a user can access a number of related sites that are tagged with information that define their content or part of their content, as related to the brand site 600.

Additionally shown is module 616 that provides answers to questions posted by users regarding the Wii™ product and services. Thus, the module for answers with entries related to the Wii™ product are also made and included into the brand site 600. The brand site 600 also includes a navigation bar 602, for example, which allows users to navigate to other pages within the brand site 600 to further focus on other categories of the same brand, as represented by different pages, which are also built by modules and advertisements which all relate to the same brand information, or provide additional characteristics for defining aspects of the brand. Examples provided in the navigation bar 602 include a home page, a Wii™ info link, a games link, a message boards link, a videos link, a buyer's guide link, and others.

Figure 7A:
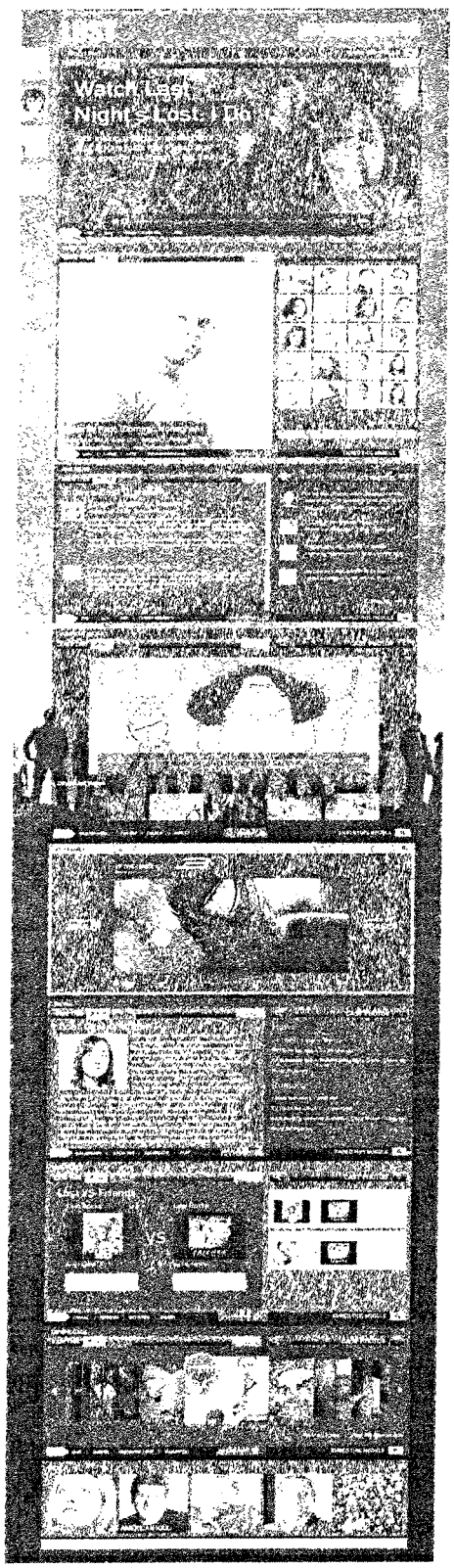
FIGS. 7A-7C illustrate example brand modules used to define a brand site, in accordance with one embodiment.
Figure 7B:
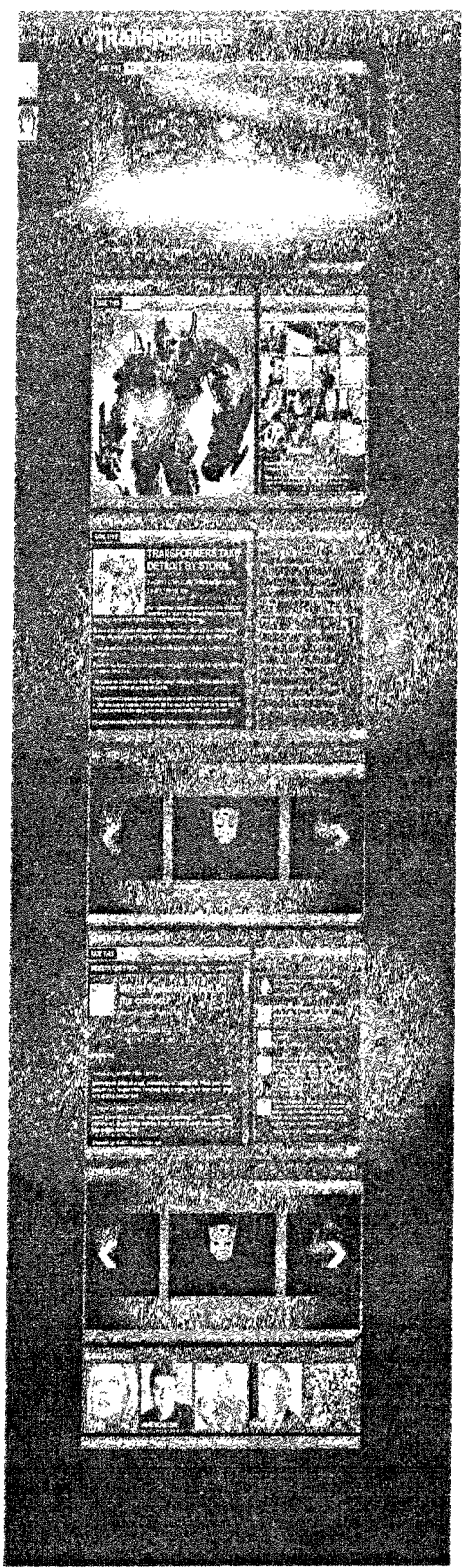

FIGS. 7A and 7B provide examples of brand sites that are constructed by assembling modules (stacked vertically in this example), that can be placed at various levels within the brand site and moved up (promoted) or moved down (demoted), depending on user interactivity, brand owner preferences, or brand site producers. The various modules, as noted above, can be moved up or down to emphasize their more relevant nature as compared to other modules within the site, and can also be demoted and moved off of the site, depending on their usefulness, interactivity metrics, and other measuring criteria.

When advertising modules are integrated into the brand site, such as advertising module 710, the module is represented in seamless manner with other content information, so as to make the advertising information blend seamlessly with the content, and so as to not obscure the experience for fans of a particular brand site. The modules are also represented in a form that provides an entertainment value to the user of the brand site, such as by providing video clips, recent activities that may relate to user questions, postings, allowing users to vote in regard to their preferences, and other information.

In one embodiment, module 714 may provide a lot of user interactivity during the module's lifetime on the brand site. For those modules that have high user interactivity, one embodiment would blend in advertisements in between content so that user sifting through content will periodically run into advertisements that blend in with the content being viewed or desired to be viewed by users. In this manner, the advertisement is presented to the user in a seamless manner that is not an obstruction or distraction to their intended use of the content. Referring to FIG. 7B, a user can be provided with advertisements such as movie trailer 740, which blend and appear to be just another module of the site.

The brand site of FIG. 7B is for transformers, and the transformers can have various types of content that allow user interactivity to further connect with the user's likes, dislikes, and increase their fan level associated with the brand.

Figure 7C:
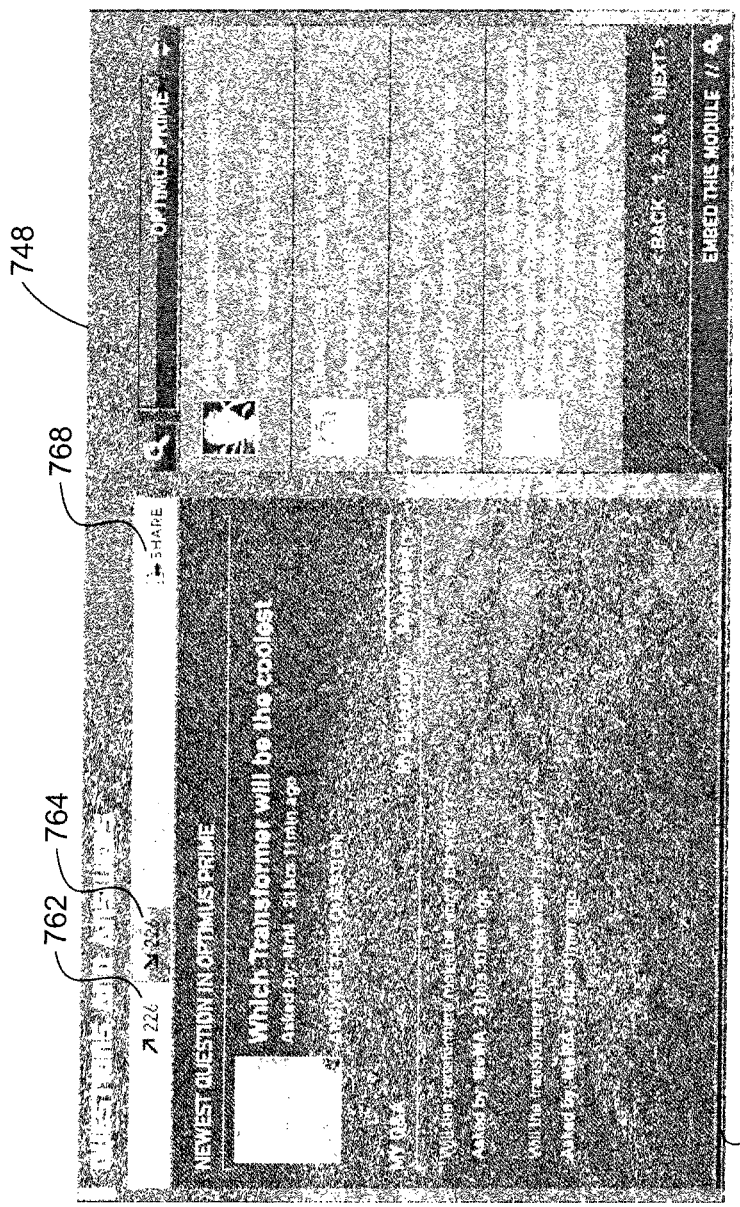

FIG. 7C illustrates and example of a module 748 from FIG. 7B. In this example, this module allows users to rate the various modules that make up the brand site. As shown, a bar labeled "rate this" allows a user to select button 762 or button 764 to indicate whether they like or dislike a particular module. If more users dislike than like the module, then the module may be demoted over time to a less prominent location on the brand site. In another embodiment, the module may be removed completely from the brand site in response to users voting the module off the site.

Modules which provide a high level of satisfaction to users, would be rated higher and possibly moved up in prominence on the brand site. Thus, module 748 is considered to be an interchangeable and pluggable module 770 that is capable of being integrated into the world site and moved up and down, depending on its prominence, based on user interactivity.

Figure 8B:
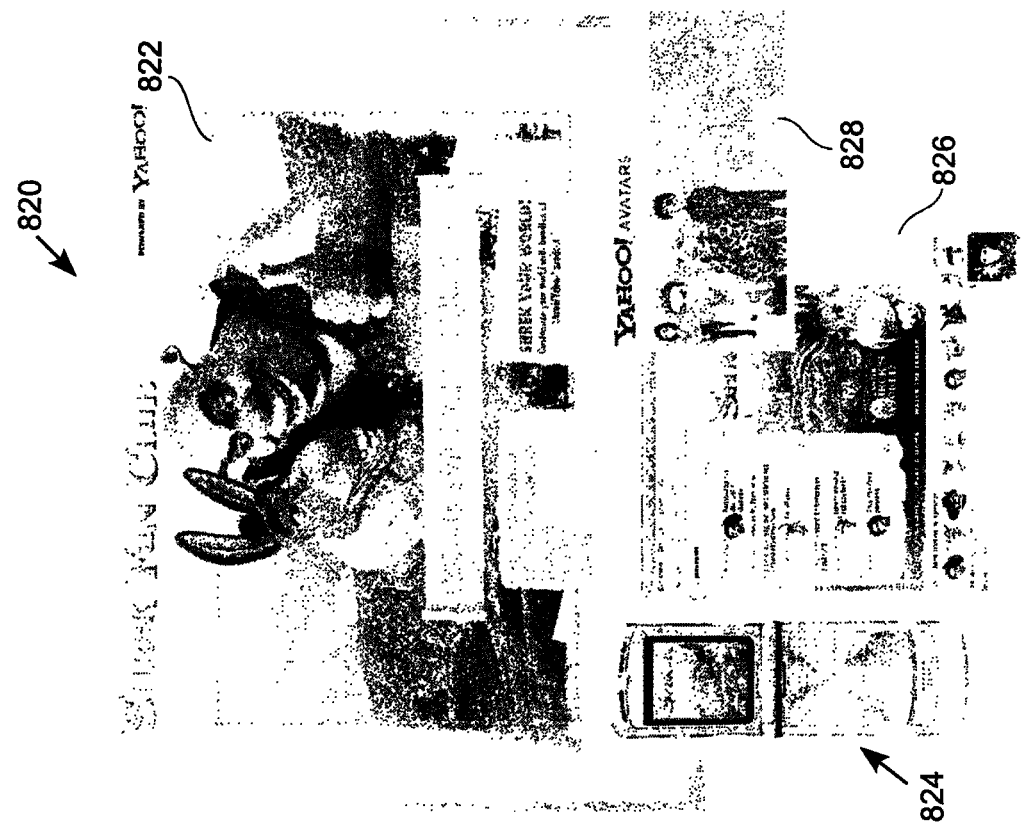
FIGS. 8A-8B illustrate examples of brand sites and advertisement integration, in accordance with one embodiment.
Figure 8A:
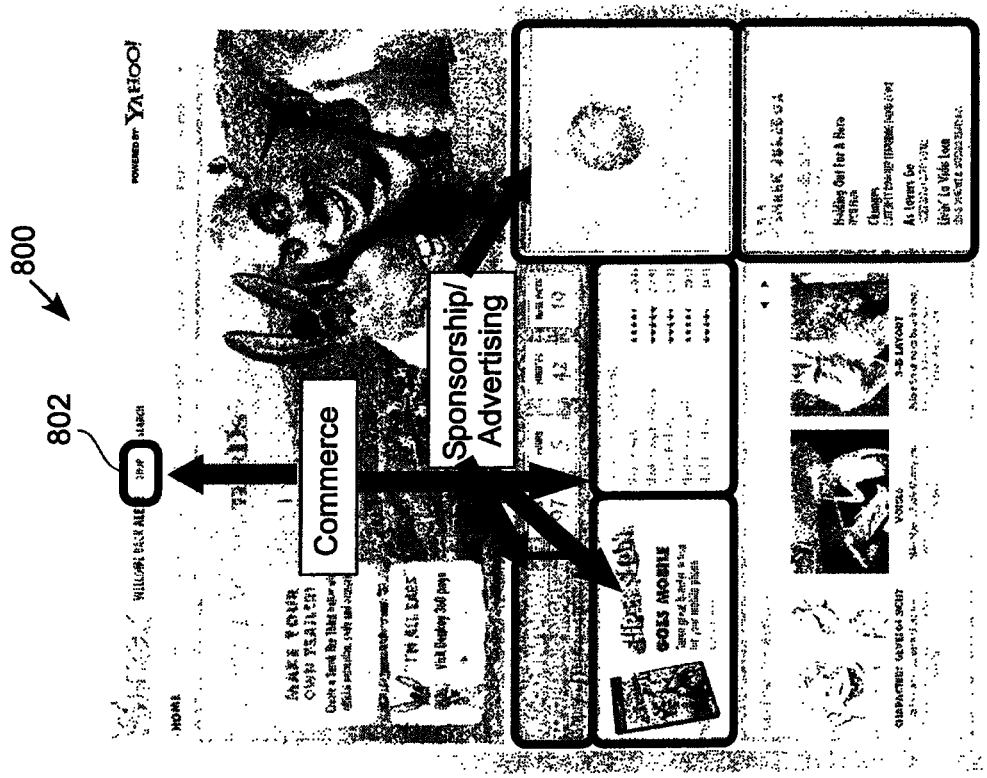

FIGS. 8A and 8B illustrate examples of a brand site for Shrek™, in accordance with once embodiment of the present invention. The brand site 800 of FIG. 8A illustrates examples of commerce transactions that are possible through the brand site. A shop icon 802 is provided to enable users to shop for Shrek™-related products or services. Additionally, sponsorship and advertisements can be provided on the same brand site 800 as those sponsorships and advertisements relate directly to the brand Shrek™.

A viewing of the brand site 800, as it relates to the sponsorships and advertisements, will illustrate a similarity in the products and services that relate to Shrek™, and their integration into the brand site do not detract from its usefulness and user desire to navigate through the content provided by the brand site 800.

FIG. 8B illustrates a brand site page that would enable users to connect to a Shrek™ fan club 822. By connecting to the Shrek™ fan club 822, users will join a club that will provide them with additional access to content, new releases, and information regarding their brand. In essence, by providing users with a club-level commitment by the brand site, the users are converted from basic users and move into a fan level, thus increasing their interactivity with the site.

As users grow closer to the interactivity of the site, users are more likely to purchase products or services related to the brand due to their "taking ownership of" the brand and committing to its products and services. As an example, users that may be part of the Shrek™ fan club could be provided with additional cell phone 824 content, special web page content 826, and special access to avatars 828.

FIG. 9 illustrates a brand site 900 for the actor Will Smith™. The actor Will Smith™ 902 is shown in a prominent location on the brand site 900 in a module located at the topmost portion of the page. A movies module 903 is provided in the brand site to enable access to clips, or movies in which Will Smith was an actor, and provides a direct relationship to the brand site 900. Module 904 is geared to provide the latest information by the actor to its audience of the brand site. As shown, Will Smith™ logged in to the brand site and provided information regarding his activities from the set of "I am legend".

This module provides users with a deep connection to the actor Will Smith and his persona, and his current activities. Another module 906 provides a photo gallery of different photographs in which Will Smith™ is captured and associated descriptions of the photographs are provided for Will Smith's™ audience. An album's module 908 is also provided that provides links to albums produced by Will Smith or in which Will Smith™ had some original contribution for, as it relates to the brand Will Smith™. Along with the modules providing information, and media which users may purchase, users are also provided with other modules in which advertisers may seamlessly integrate their products and services in a user friendly manner. For instance, module 910 is integrated into the brand site in close relation to Will Smith's™ movie clips, which makes the advertisement flow to the user of the brand site.

A module 912 is also provided to enable users to post their questions related to some content or activities or content provided in the brand site 900. A photos gallery is also provided in module 914, and a ringtone and music list is provided in module 916. Module 909 also provides a featured music video that can be played while users visit the brand site 900. The various modules that make up the brand site 900 therefore define the brand universe system's ability to access content from vertical sites (i.e., use or share instances of the brand content) and obtain dynamic data and feeds into the site to make the site appear, and function as an up-to-date portal of information that is composed of information continuously generated and submitted by the brand owners, advertisers, and users.

In still another embodiment, the brand site is more than just a site, as brand experiences can be distributed through out the internet. As one example only, a blogger can add a video module on a blog about the brand or related site. This brand related content is thus integrated with the brand site.

FIG. 10A illustrates a movie site 136 that can display a number of movie parts 960, that relate to different movies being presented on the movie site 136. As noted above, this may be a vertical site that targets a particular media type. Additionally, a user may decide to post advertising for a specific movie or relate advertisements to a specific movie on the movie site 136. In this example, the Shrek™ movie content 136-1 is shown in the movie site 136. Additionally, an ad posting 952 which may have been posted to the movie site, by virtue of advertising through a brand-related posting, will be linked to (or associated with, or placed beside) the specific movie content.

FIG. 10B illustrates a game site 140, where game parts 962 are illustrated, as well as a Shrek game content 140-1. If the user has selected to advertise for a selected brand, the user's advertising posting 952 may also be correlated to the Shrek game 140-1, as shown in FIG. 10B. The associating may be by virtue of placing the advertisement beside the Shrek™ game, or blending the advertisement with portions of the Shrek™ game, in between games, in between game levels of a game, etc. Any number of associating techniques may also be used, so long as a brand association occurs when a posting is set to relate to particular advertisements of specific brand parts (that may be present on the various vertical sites).

Additionally, FIG. 10C shows a brand site 124. The brand site 124 may also include content parts from the various sites, such as the movie site 136 and the game site 140. In this example, the Shrek™ game 140-1 and the Shrek™ movie 136-1 is part of the brand site 124. Still further, the brand-related advertisement that was posted 952, is also shown in association with the component parts of the brand site. For instance, if the user desired to post a brand advertisement for the Shrek™ brand site 124, that advertisement may also be populated to the various individual websites that also contain the Shrek™ content. In one embodiment, the user may be allowed to select whether to post the advertisement in the entire interconnected web of websites, as well as the brand site, or only in particular websites and the brand site, or combinations thereof.

FIG. 11A illustrates an advertising management site 950 that has various options to allow advertisers to access site metrics, post advertisements, manage their advertisements, and relate advertisers to certain brand elements, in accordance with one embodiment of the present invention.

The advertisement management site 950 shown in FIG. 11A has a brand site selection 956 region that allows advertisers to select brand sites that may be of interest for advertising. In one example, an advertiser may access the advertisement management site 950 and use selector 957 to select the brand site Shrek. If the advertiser selects the brand site Shrek™ using selector 957, the advertisement management site 950 may display another page as shown in FIG. 11B.

FIG. 11B illustrates a page of the advertising management site 950 where the user/advertiser is provided with related site 958 information and advertisement submission and format 960 features. In one example, the related site 958 identification will display the various websites that contain Shrek™ material. In this example, other websites that may contain Shrek™ material may include a games website, a movies website, and others. As shown, the user has selected, by checking boxes for advertisement, advertising in the game site, and the movie site. Before the user advertises in these particular websites, the user is also provided with advanced options 959, that allow the user to determine other advertisement options presented by the advertising management site 950.

The advanced options may provide information regarding page usage by users, previous advertisers, rates for advertising, special programs, etc. Of course, any number of other options may also be provided using the advanced option feature 959. In one embodiment, the features and options are presentable for each particular website or brand site. Further, the user may be allowed to post advertisements using the advertisement format 960 feature. The user may be prompted to select the type-format of advertisement that they wish to post.

For instance, the user may be provided with selection menus that will allow the user to identify and select banner types, clip videos, pic-photos, animated ads, and the like. A number of other screens and menus (not shown) may be provided to allow the user to format and post the particular advertisement for the specific brand site and websites having brand content.

Figure 11C:

FIG. 11C illustrates the advertisement management site 950 where a user that has advertised on the site is provided with information regarding the advertisement activity. In one example, the user is provided with a listing of sites as well as the brand site 951, where advertising will occur in relation to their desires to post advertisements for these particular websites, as well as the brand site. The user can also be provided with advertising owner tools 964. The advertising owner tools 964 allow the user to see details regarding their postings for the specific brand site, and the website containing the components of the brand.

The owner tools 964 may provide additional details, and monitoring methods that define user activity in relation to their advertisements, and other e-commerce related information. Accordingly, the user (e.g., ad owner) may be given instantaneous access to determine whether their advertising for the specific brand and in a specific website, is providing a return as expected, based on prior use metrics, current use metrics, or other information.

If for instance, an advertiser places ads in one site, two sites, or multiple sites, and/or also a brand site(s), the use metrics can be broken down in a number of ways. The advertiser can be provided with detailed metrics for single sites, multiple sites, multiple brand sites, or a combination of all. Consequently, the advertiser is able to obtain rich information that is broken down into the best way understood by the advertiser and will allow for intelligent decisions regarding the placement of further ads, renewals, cancellations, etc.

Figure 11D:
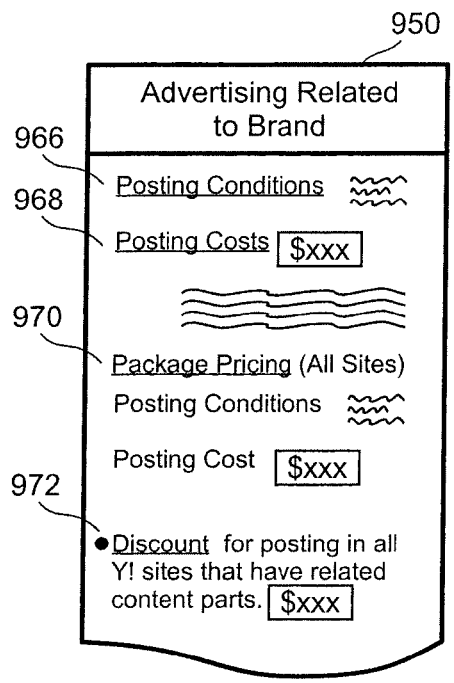

FIG. 11D illustrates an example where a user may be provided with a posting conditions region 966, a posting cost region 968, a package pricing region 970, and a discount region 972. These different regions may be provided to the ad owner (or marketing professionals) as additional ad owner tools that allow the user to determine what the conditions are for the posting (e.g., posting contract), as well as the cost associated with posting an advertisement in each of the websites, as well as the posting in the brand site. Additional features may include the package pricing capability that will allow a user to post one advertisement associated with a particular brand, and that advertisement is automatically populated to all instances of the brand throughout the various websites.

Additionally, the user may be provided with discount information for pricing associated with package postings. E-commerce transaction screens may also be provided to allow the user to submit content, format content, pay for content, monitor demographics associated with their postings, and monitor income generated from user activity.

Figure 11E:
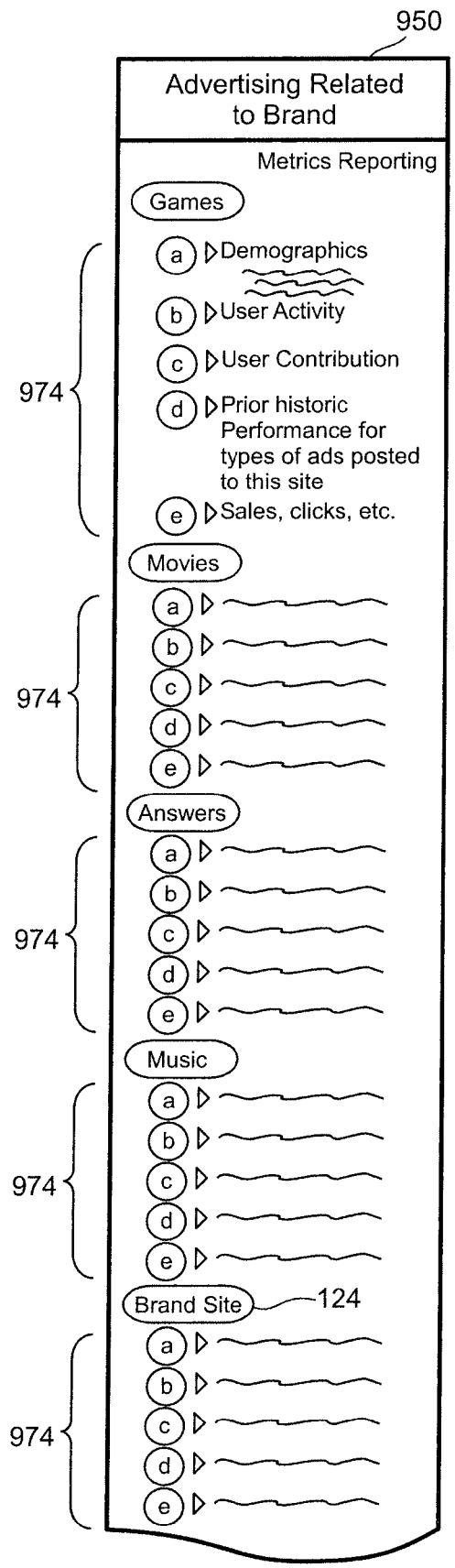

FIG. 11E illustrates a metrics reporting screen that may provide yet additional information to the user that is posting advertisements on the brand sites. The advertiser may be provided with detailed monitoring 974 that may be granularly displayed for different aspects of the various websites, as well as the brand site. Example metrics may include demographics of users accessing the specific websites, the user activities on those websites, the user contributions to those websites, prior historic performance for the types of ads posted on these websites, previous sales, clicks, and other metrics associated with determining whether advertisements are performing or not.

These detailed metrics 974 may also be provided for the brand site, as specific advertisements may also be joined or placed in close relation to specific portions of content on the brand site. For instance, an advertiser may wish to have his or her brand advertisement placed next to music type content. Or, the advertiser may wish to have his or her advertisement always placed closer to message boards related to the brand. In either case, the user/advertiser is provided with various capabilities to place advertisements and tie them specifically to a brand and brand parts within a brand site, or the websites from which the content is shared with the brand site. These and other advertising features are enabled by the systems, methods and computer readable media of the advertising modules.

III. Cross-Market Brand Ad Placement and Optimization

FIG. 12 illustrates a graphical representation of a plurality of instance-level websites 134, as related to acceptance of proposed advertising, in accordance with one embodiment of the present invention. Each of the instance-levels 134 represent websites that are part of a network of sites. The network of sites can include websites for particular types of interests, information, communication, groups, etc. An example network of websites is the network serviced by Yahoo!™, Inc., of Sunnyvale, Calif.

The websites can be accessed from a homepage that provides links to the various instance-level websites, directly at a given address, or by link. For purposes of illustration, the instance-level websites include an autos website, a travel website, a sports website, and others. In this illustration, a user may wish to place an advertisement in one or more of the instance-level websites of the network. The proposed advertisement "A" 1012 is the advertisement that the user wishes to place on one or more websites of the network. The proposed advertisement A 1012 is shown to contain ad content 1020. This ad content 1020 will include advertisement data that will then be propagated to the various instance-level websites per the final placement selections dictated by optimized processing, in accordance with one embodiment of the present invention.

As shown, the instance-level websites can include content of various types, such as text, images, video, graphics, animations, and combinations thereof. Particularly, the instance-level websites can include a plurality of modules 1010 that serve as self-contained module page entities that can be placed, removed, updated, etc., to or from each of the various websites. The modules 1010 may be capable of receiving the proposed advertisement "A" as shown, and the modules can, and often do include other content. In one embodiment, the instance-level websites can include content related to a particular brand, and such brand related content is noted as "B" 1014. B 1014 is shown integrated within various parts of the instance-level websites 134, as well as in various modules 1010.

As noted above, a brand site 124 is one that primarily caters to the particular brand, whereas the instance-level websites can include content related to the brand, but are not necessarily targeting a focus around the brand. Thus, a user wishing to place an advertisement and correlate that advertisement to a particular brand, would have to select various instance-level websites that have at least some correlation to the brand. If the brand site 124 relates to a brand of truck-type vehicles, then the user wishing to place ad "A", may wish to place his advertisement for the ad instance 1020 in close relation to the truck brand. Although a truck is noted to be a brand, it should be broadly understood that the brand can be for any commercial brand, and can be in the form of products, services, people, groups, etc.

The user could place the advertisement directly in the brand site 124, but the user may also wish to place the advertisement A in the different instance-level websites, and so positioned in some type to relationship to the brand content that may be present in the various instance-level websites. As shown in the autos site, brand related content B is shown placed in close relation to the desired placement of the proposed advertisement A 1012. Thus, a user would benefit from placing the advertisement content 1020 in close relation to the brand content B, which may be currently shown on the auto site. In a similar way, the user would benefit from placing the advertisement A in close relation to the brand content in the travel site and in the sports site. However, placing advertisements next to particular brand content on the various instance-level websites may be difficult due to the ever-changing content on the instance-level websites.

In one embodiment, a processing engine is configured to allow for the automated recommendation of placements for particular advertisements in the different instance-level websites, depending on the user's defined goal. For example, if the user wishes to place an advertisement that is targeting a new product introduction, the user may wish to optimize the placement for optimum visual impact as opposed to optimizing the revenue that may be generated from the advertisement itself. If the user was optimizing for cost of placement, a different model would be generated. Each of the models would, however, be generated so that placement of the advertisement is placed or presented in close relation to a particular brand identity, as may be selected by the user.

Figure 13:
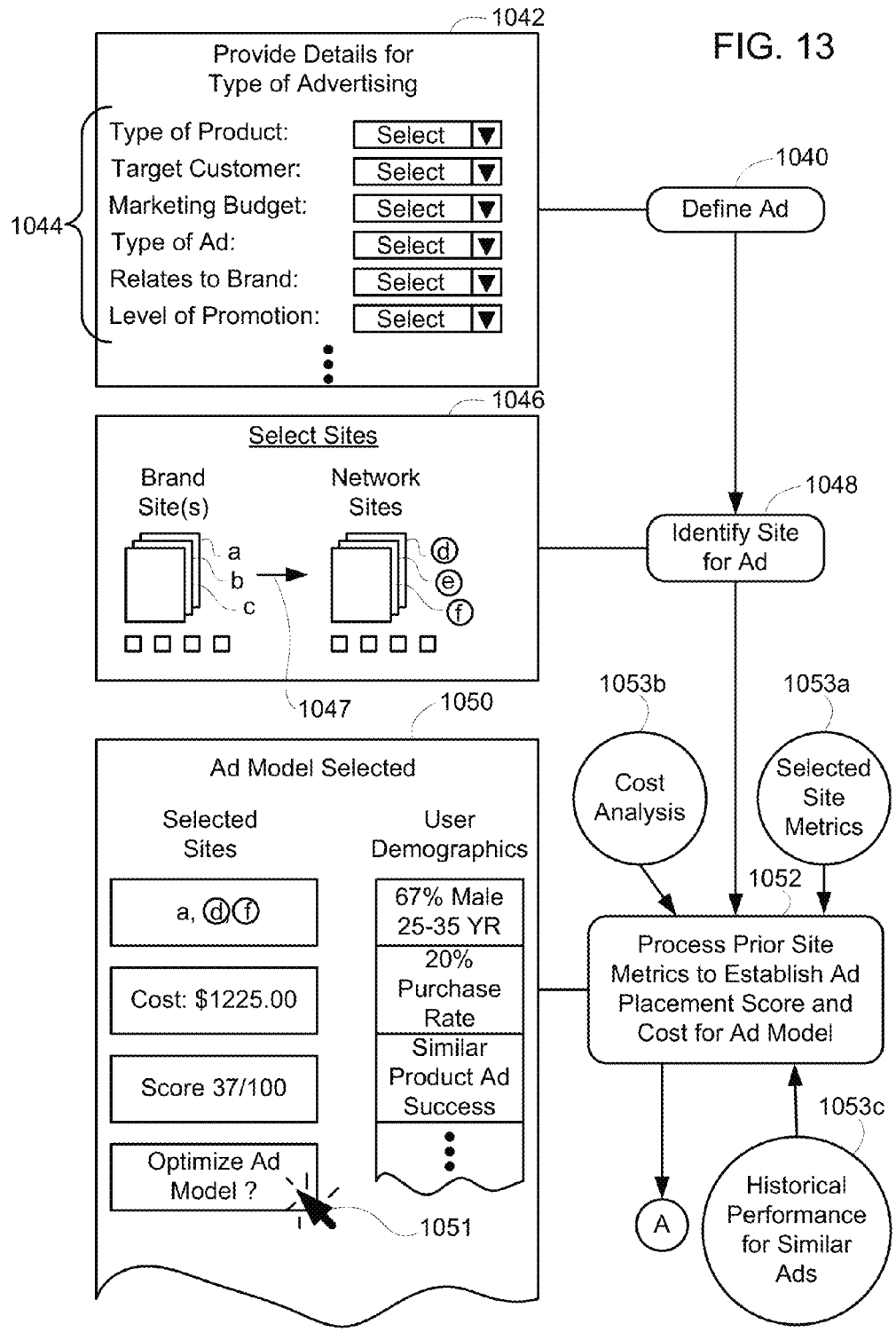
FIGS. 13 and 14 identify a process for defining an ad and for shaping the identification of an optimized set of websites, for placing an ad.

FIG. 13 illustrates a process for inputting attributes about a proposed advertisement, and then processing the advertisement to generate an ad model that identifies particular sites for which the ad should be placed, in relation to the brand that is selected. Initially, in an attribute's entry page 1042, a user is asked to define the ad in operation 1040. The user is prompted to select various categories 1044, which include, for example, what type of product or service, the target customer, the marketing budget, the type of ad (graphic, text, video, etc.), and how the ad relates to the brand, and the level of promotion desired for the particular advertisement. The content for the ad may also be uploaded at this time.

It should be noted that these parameters are provided as an example, and they are not exhaustive of the different particulars and attributes that can be used to define the type of ad for which a user wishes to place, in accordance with one embodiment of the present invention. Based on the attributes that are provided by the user, the system will then provide an initial site selection page 1046. The initial site selection page 1046 will allow the user to identify sites for the ad in operation 1048. In this embodiment, the user is presented with a plurality of different brand sites. The plurality of brand sites are noted as a, b, and c. Other brand sites may also be provided for the user so the user can select the particular brand that he or she wishes to target, for the particular advertisements.

In one embodiment, the user may select a particular brand "a" that relates to trucks. The brand site for trucks "a" is then processed so as to generate a new plurality of network sites that include content related to the brand "a". The network sites are d, e, and f. If, however, the user had selected a different brand, different network sites would be suggested in this initial site selection page. Accordingly, the user will first have to select a brand site and then, the system will generate a plurality of options or categories of network sites that are suitable for advertising the particular ad so that a correlation can be made between the selected brand and the ad that is going to be placed.

Based on the selections by the user, the process moves to an ad model page 1050. Ad model 1050 is generated by processing site metrics (of the selected sites, e.g., sites a, d and f) to establish ad placement scores and also the cost for the ad model. As shown, the processing 1052 will take into account selected site metrics 1053$a$, cost analysis 1053$b$, and historical performance for similar ads 1053$c$. The processing will thus generate the data that is presented in the ad model 1050. The ad model 1050 illustrates the various selected sites, which are shown to be "a" for the particular brand, and "b" and "f" of the network sites.

This selection is generated based on the selections inputted by the user in the screen 1046. Based on the user's entries, a particular cost is derived for the placement of the ad. In addition, a score is generated for the ad, and the score is an absolute score similar to a rating. The higher the score, the closer the ad placement is to the desired goal. Thus, the score is the result of processing the selected site metrics for the sites "d" and "f", and analyzing the historical performance for similar ads on those particular sites, as well as the cost analysis for the type of ad being generated. The processing can also generate user demographics that indicate who would be interested in these particular advertisements, and the purchase rate associated with these particular advertisements.

Purchase rate can be categorized in terms of the number of clicks, the number of sales, the number of interest or comments, or different types of interaction. Additionally, the user can be provided with a listing of similar products that have advertised with this particular ad model and the ad's success. At this point, the ad model is the preliminary model generated based on the user's own selection of the particular network sites that were d and f. If the user wishes to further optimize the ad model, the user can select operation 1051 so that the ad model can be optimized using multi-variable optimization.

Figure 14:
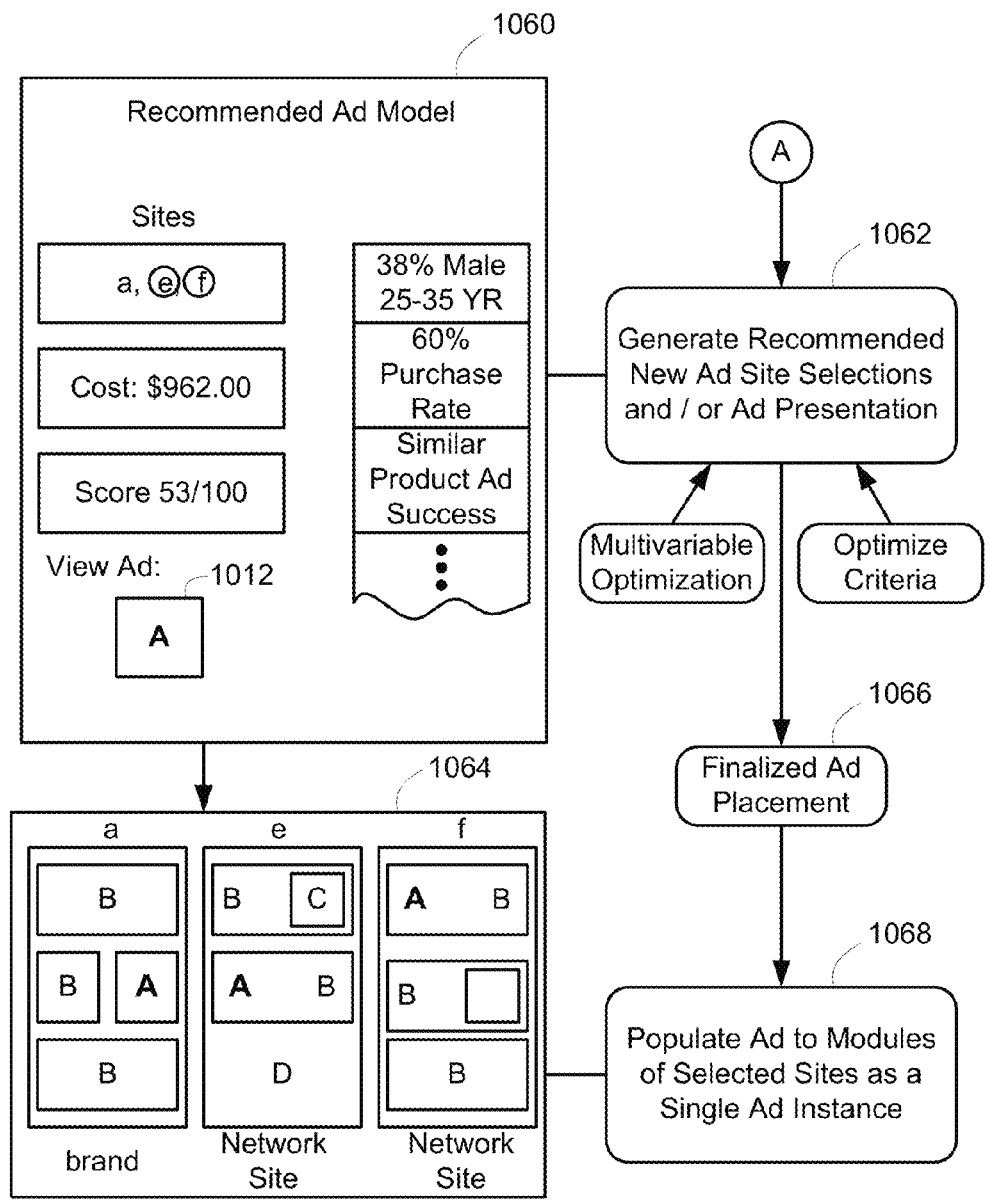

In FIG. 14, a screen 1060 is shown that illustrates a recommended ad model. The recommended ad model has been adjusted so as to recommend that the user only advertise in sites e and f, as opposed to the original sites that the user had selected, which were d and f. These limited number of sites are shown in this example for ease of illustration, however, it should be understood that the number of sites can be many (including sub-pages or links to single sites), and a number of types of brand sites can also be many. In this example, the cost for placing the ad has actually been reduced for the user, while the score increased from 37 to 53. In addition, user demographics are also shown such that the purchase rate has increased to 60 percent. In this example, the optimized and recommended ad model was primarily optimized to increase the purchase rate.

The particular parameter that the user wishes to optimize on is an input to the system and thus, the recommended ad model would be different if the user's inputs or desired optimization parameters are different. In operation 1062, the generated recommended new ad site selections and/or ad presentation is generated, based on a multi-variable optimization, and the optimization criteria provided by the user. Multi-variable optimization is a mathematical process that takes in a plurality of variables, such as the desired outcome of the ad, and then presents a selection of variables that would optimize as specific outcome. Multi-variable optimization mathematics and processes are well known in the art, and any number of these processes may be used so as to enable the optimization of the particular criteria defined by the user.

In screen 1060, the user is provided with another option to view the ad 1012, and thus present a screen 1064 that shows the advertisement A in the particular brand site, as well as the network sites that were selected to be optimal, based on the user's criteria. The finalized ad placement 1066 is then presented so that the user can view the ad in the example websites, by populating the ad as shown in operation 1068. Formatting may also be applied, to enable the user to visualize either a final product or a prototype of the ad placement.

Figure 15:
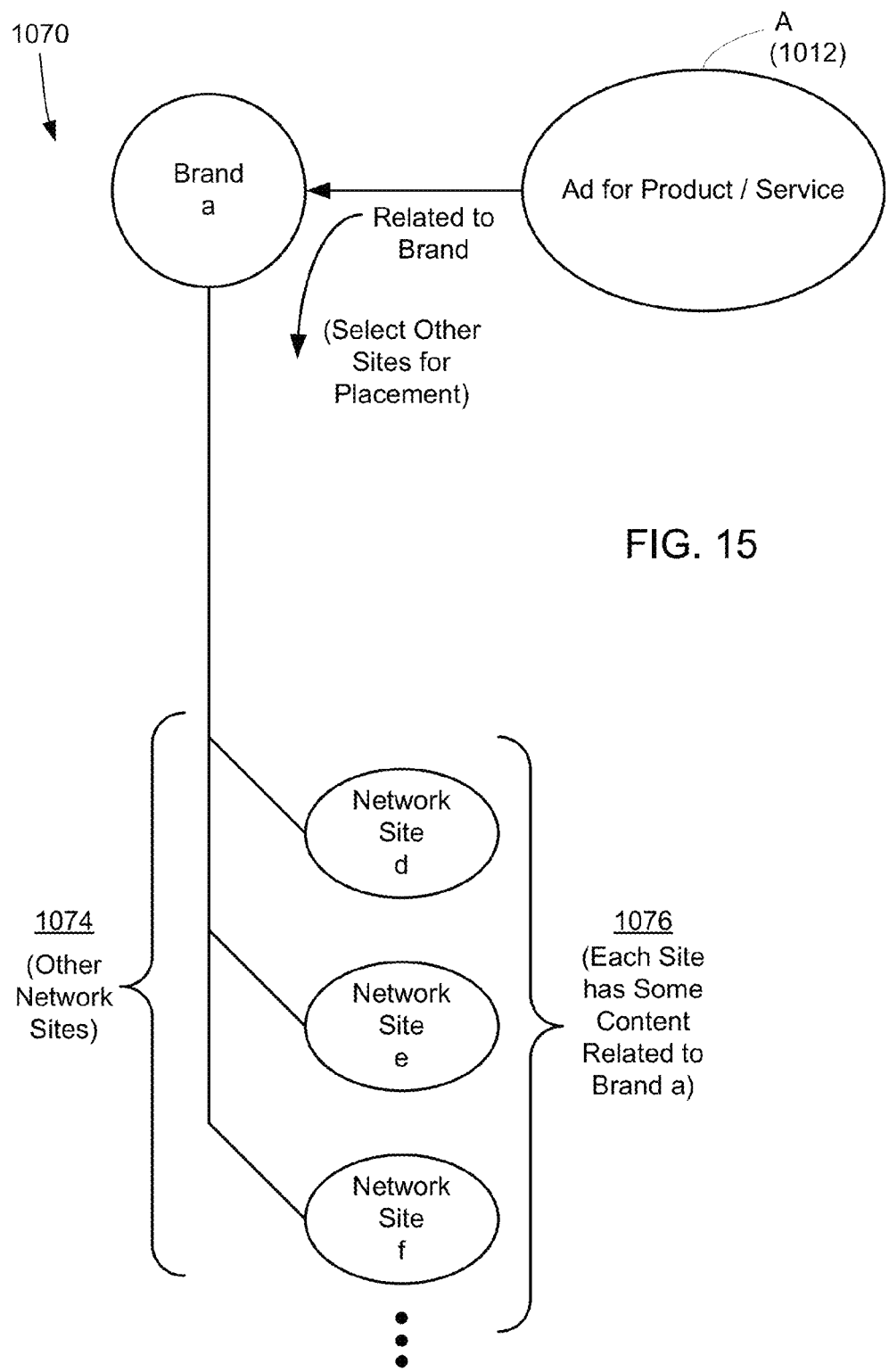
FIG. 15 shows a relationship between a brand site and the network sites that have some content related to the brand, in accordance with one embodiment of the present invention.

FIG. 15 illustrates an example where an ad for a product or service A is placed in relation to a particular brand a. The structure 1070 is shown to illustrate the relationship of a user selecting a particular brand for which to correlate or assimilate the particular ad placement and then populate that advertisement to the various websites, which may be part of the network or other brands. In this example, the other network sites are 1074. Each of the sites that are shown to be part of the network site, e.g., sites d, e, and f, have some content that relate to brand A.

For this reason, the user that selected the advertisement to be related to brand a, will be shown a listing of network sites that also include at least some content that relates to brand a, integrated within the network sites. If the selection were for the advertisement to relate to brand b, a different subset of network sites will be presented, and similarly, if the advertisement were to be related to brand c, yet a different subset of network sites would be presented as options for the user to initially select the brand to be placed on those sites.

As noted above, there is an initial selection by the user to select particular network sites based on an initial brand selected, and thus, to generate an initial and preliminary ad model as shown in 1050 of FIG. 13. If the user wishes to optimize the ad model, the optimized model would then generate potentially a different set of network sites to advertise in, as opposed to the initial set. In other embodiments, it may be possible that the initial ad model would be identical to the recommended ad model, if the user intelligently selected the different sites and the different sites correlate to the particular goals desired by the user, when optimized using the multi-variable optimization.

Figure 16:
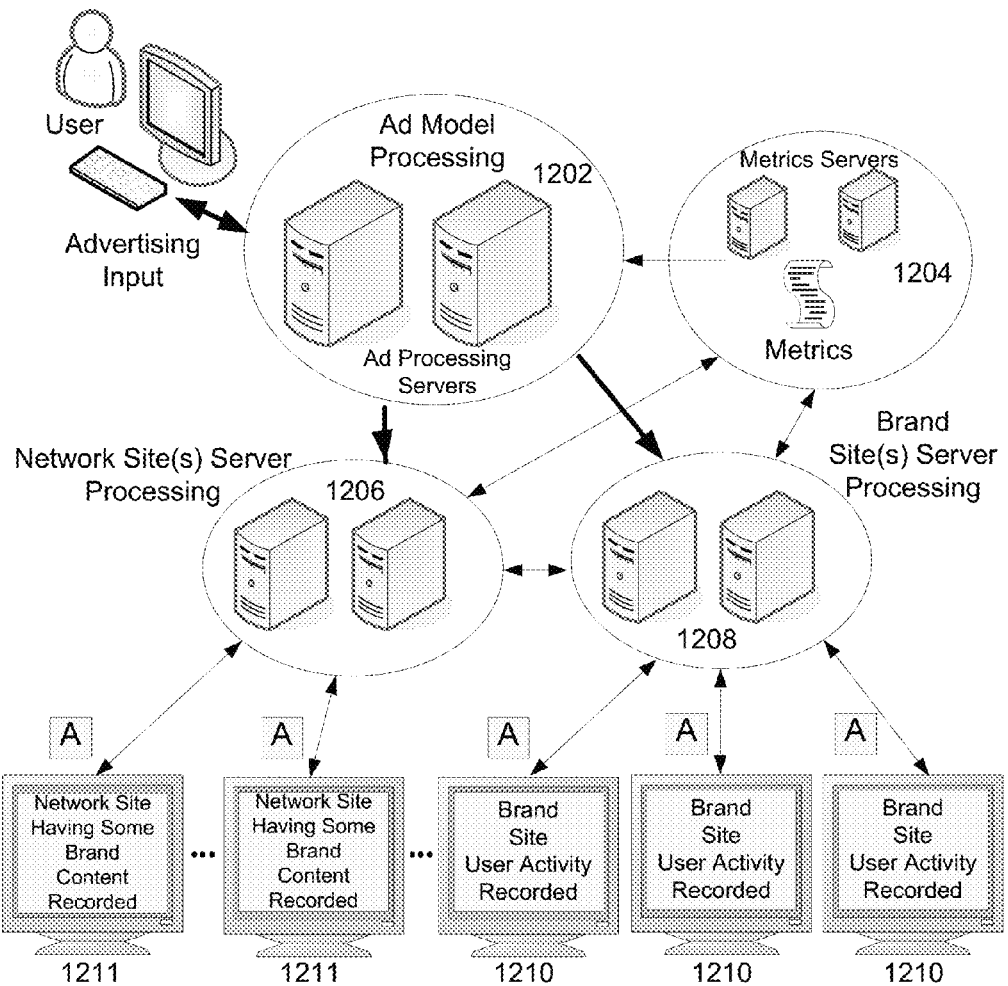
FIG. 16 illustrates a system diagram of servers and communication with the servers to process the optimized recommended ad model, in accordance with one embodiment of the present invention.

FIG. 16 illustrates a system where an ad processing server 1202 is shown in communication with a user that provides advertising input. The ad processing server 1202 is in communication with metrics servers 1204. The metrics servers 1204 are themselves, communicating with the network site server processing and the brand site server processing servers 1206, and 1208, respectively. The network site and brand site servers processed the different websites that are then monitored to determine metrics of use, popularity, purchases, interactions, communication, changes in content, and the like.

These various metrics are then stored by the metric servers 1204 and made available to the ad processing module 1202. The metrics servers 1204 are therefore continuously updated based on the activity at the network sites and the brand sites. The brand site activity is recorded as shown in monitors 1210 and the network site activity is recorded in 1211. The network site activity is recorded for metrics calculations if the network site includes some brand content that may relate to a particular brand site. For instance, if a sports site includes some content related to one of the brand sites, that particular website and the content that is related to the brand site content on the network site is monitored.

By monitoring these metrics, it is possible for the ad model processing 1202 to identify network sites that include some brand content that relates the brand, and also fine tune the suggested network sites, based on the target optimizing criteria provided by the user. The advertisement A can then be populated to the different network sites and brand sites, if appropriate.

Figure 17:
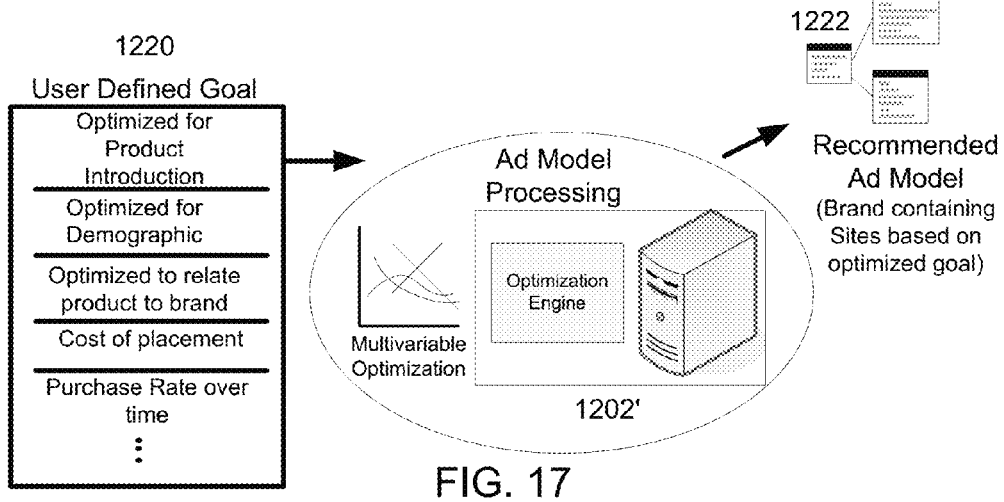
FIG. 17 illustrates example input parameters, defining the user's goals, which can be used to generate the optimized recommended ad model.

FIG. 17 illustrates an example where user defined goals 1220 may include a plurality of goals. The plurality of goals may be optimized for product introduction, demographics, optimized to relate a product to a brand, cost placement, purchase rate over time, etc. These goals are inputs from the user, in addition to the definition of the ad and the related focus of the ad to some brand. The ad model processing 1202' takes in the inputs and executes an optimization engine. The optimization engine process a number of multivariable computations to optimize on one or more criteria, as may be defined by the user. Example multivariable computations includes graphing techniques to find interactions in lines, planes and multidimensional surfaces. In some cases, the multivariable computations include finding minimums or maximums in curves, surfaces or intersecting planes. Example multivariable algorithms include, but are not limited to (1) minimum search by coordinate and conjugate directions descent, (2) Powell's method; (3) the modified Hooke-Jeeves method (4) simplex Nelder-Meed method; (5) quasi-gradient method; (6) random directions search; and (7) simulated annealing, all of which are know and incorporated herein by reference. Multivariable optimization is also sometimes referred to as multivariate testing or multivariate optimization. The generic process defines the ability to "optimize" content or groups of content, to present the best possible combination of content given some limiting criteria. The limiting criteria, as used herein, is the user's goal.

The goal may be to generate more revenue, define a splashy advertisement, a high profile promotion, etc. The process can be holistic and should be able to work on any page on a site and on any form of content, and can recognizes interrelationships among elements on a page and a site. Thus, based on the optimization, a set of recommended websites are presented to the user in the form of a recommended ad model 1222. The websites that are recommended each have at least some content that relates to the brand.

IV. Brand Site Product and Computer-Implemented Structure

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving attributes of an advertisement to be placed on one of a plurality of brand-centric websites, the brand-centric websites focused on a brand;
    presenting the brand-centric websites to an advertiser based on the attributes;
    receiving a selection of the one of the brand-centric websites from the advertiser;
    analyzing the one of the brand-centric websites to search a computer network to generate suggestions of content-related websites in which the advertisement is to be placed, wherein the content-related websites in which the advertisement is to be placed has less information regarding the brand than that in the one of the brand-centric websites in which the advertisement is to be placed, wherein the content-related websites include content related to the brand and other brands, wherein the one of the brand-centric websites has a plurality of content modules, wherein each of the content modules has some of the content regarding the brand, wherein the content is transferred via the computer network from the content-related websites to the one of the brand-centric websites, wherein data for generating the content is obtained by a harvester, wherein a data type processor is configured to classify the data into video, audio, and text to generate classified data, wherein the classified data is stored in a content repository, wherein the content-related websites request the classified data via corresponding application programming interfaces from the content repository;
    obtaining metrics from selected websites and historical performance for similar advertisements when placed on the selected websites, the selected websites including the one of the brand-centric websites and one or more of the content-related websites;
    processing the obtained metrics and the historical performance to preliminarily define an advertising model, the advertising model defining a score correlated to effectiveness of the advertisement; and
    optimizing the advertising model to define a recommended advertising model, the recommended advertising model defining optimal suggestions of websites including the one of the brand-centric websites that has the classified data obtained from the content repository and in which the advertisement is to be placed,
    wherein the optimizing of the advertising model includes multivariable optimization to enable emphasis or non-emphasis of selection criteria, and the multivariable optimization being adjustable to achieve optimization for popularity, or monetization, or product introduction, or a combination thereof.

2. A method as recited in claim 1, wherein the attributes of the advertisement relate to at least one of product or service type, target customer, marketing budget, type of ad, and level of promotion.

3. A method as recited in claim 1, wherein the one of the brand-centric websites is defined by the content modules, each of the content modules contains one or more of text, or images, or video clips, or graphics, or a combination thereof, and each of the content modules includes the content focused on the brand.

4. A method as recited in claim 1, further comprising identifying the brand-centric websites that are part of a network of websites that include the content related to the brand, wherein the method is executed by a processor.

5. A method as recited in claim 4, wherein the brand-centric websites include a linkage to the brand.

6. A method as recited in claim 1, wherein the obtained metrics include data related to activity of the content in terms of popularity and the historical performance includes monetization realized from the similar advertisements when placed on the selected websites.

7. A method as recited in claim 1, wherein the processing includes generation of performance and cost data for the advertising model, the performance including anticipated monetization for the advertisement and anticipated cost for placement of the advertisement.

8. A method as recited in claim 1, wherein the recommended advertising model includes selections to achieve the optimization.

9. A computer-implemented method being processed by a server in response to communication from a remote computer that is connected to the server over the Internet, comprising:
    receiving from an advertiser, attributes of an advertisement to be placed on one of brand-centric websites that focuses on a brand;
    presenting the brand-centric websites to the advertiser based on the attributes;
    receiving a selection of the one of the brand-centric websites from the advertiser;
    analyzing the one of the brand-centric websites to search a computer network to generate suggestions of content-related websites in which the advertisement is to be placed, wherein the content-related websites in which the advertisement is to be placed has less information regarding the brand than that in the one of the brand-centric websites in which the advertisement is to be placed, wherein the content-related websites include content related to the brand, wherein the one of the brand-centric websites has a plurality of content modules, wherein each of the content modules has some of the content regarding the brand, wherein the content is transferred via the computer network from the content-related websites to the one of the brand-centric websites, wherein data for generating the content is obtained by a harvester, wherein a data type processor is configured to classify the data into video, audio, and text to generate classified data, wherein the classified data is stored in a content repository, wherein the content-related websites request the classified data via corresponding application programming interfaces from the content repository;

obtaining metrics from selected websites and historical performance for similar advertisements when placed on the selected websites, the selected websites including the one of the brand-centric websites and one or more of the content-related websites;

processing the obtained metrics and the historical performance to preliminarily define an advertising model, the advertising model defining a score correlated to effectiveness of the advertisement; and optimizing the advertising model to define a recommended advertising model, the recommended advertising model defining optimal suggestions of websites including the one of the brand-centric websites that has the classified data obtained from the content repository and in which the advertisement is to be placed, the optimizing using multivariable optimization to correlate the obtained metrics to a desired optimization criterion, wherein the optimizing of the advertising model includes multivariable optimization to enable emphasis or non-emphasis of selection criteria, and the multivariable optimization being adjustable to achieve optimization for popularity, or product introduction, or monetization, or cost of placement, or demographics, or a combination thereof.

10. A computer-implemented method as recited in claim 9, wherein the attributes of the advertisement relate to at least one of product or service type, target customer, marketing budget, type of ad, and level of promotion.

11. A computer-implemented method as recited in claim 9, wherein the one of the brand-centric websites is defined by the content modules, each of the content modules contains text, or images, or video clips, or graphics, or a combination thereof, and each of the content modules includes the content focused on the brand.

12. A computer-implemented method as recited in claim 9, further comprising identifying the brand-centric websites that are part of a network of websites that include the content related to the brand, wherein the computer-implemented method is executed by a processor of the server.

13. A computer-implemented method as recited in claim 9, wherein the brand-centric websites include a linkage to the brand.

14. A computer-implemented method as recited in claim 9, wherein the obtained metrics include data related to activity of the content in terms of popularity and the historical performance includes monetization realized from the similar advertisements when placed on the selected websites.

15. A computer-implemented method as recited in claim 9, wherein the recommended advertising model includes selections to achieve the optimization.

16. A computer-implemented method as recited in claim 9, wherein the one of the brand-centric websites is defined by the content modules, each of the content modules contains text, or images, or video clips, or graphics, or a combination thereof, and each of the content modules includes content focused on the brand.

17. A system comprising:

an ad processing server in communication with a remote computer accessed by an advertiser, the ad processing server receiving attributes from the remote computer of an advertisement to be placed in relation to one of brand-centric websites, the ad processing server presents the brand-centric websites to the advertiser based on the attributes, the remote computer receiving a selection of the one of the brand-centric websites from the advertiser, the ad processing server analyzing the selection of the one of the brand-centric websites to search a computer network to generate suggestions of content-related websites in which the advertisement is to be placed, wherein the content-related websites in which the advertisement is to be placed has less information regarding a brand than that in the one of the brand-centric websites in which the advertisement is to be placed, wherein content related to the brand is transferred via the computer network from the content-related websites to the one of the brand-centric websites, the content-related websites include the content related to the brand, wherein the one of the brand-centric websites has a plurality of content modules, wherein each of the content modules has some of the content regarding the brand, wherein data for generating the content is obtained by a harvester, wherein a data type processor is configured to classify the data into video, audio, and text to generate classified data, wherein the classified data is stored in a content repository, wherein the content-related websites request the classified data via corresponding application programming interfaces from the content repository, a metrics server for processing metrics for selected websites and historical performance for similar advertisements when placed on the selected websites, the selected websites including the one of the brand-centric websites and one or more of the content-related websites, the metrics server processing metrics and the historical performance used to preliminarily define an advertising model, the advertising model defining a score correlated to effectiveness of the advertisement; and an optimization engine to process the metrics and the historical performance, the optimization engine configured to perform multivariable optimization to generate a recommended advertising model, the recommended advertising model defining optimal suggestions of websites including the one of the brand-centric websites that has the classified data obtained from the content repository and in which the advertisement is to be placed, wherein the multivariable optimization enables emphasis or non-emphasis of selection criteria, and the multivariable optimization being adjustable to achieve optimization for popularity, or product introduction, or monetization, or cost of placement, or demographics, or a combination thereof, wherein the content modules contain text, or images, or video clips, or graphics, or a combination thereof.

18. The system of claim 17, wherein the brand is a single brand.

19. The system of claim 18, wherein the attributes of the advertisement relate to at least one of product or service type, target customer, marketing budget, type of ad, and level of promotion.

20. The system of claim 18, wherein the ad processing server identifies the content-related websites that are part of a network of websites that include the content related to the brand.

21. The system of claim 18, wherein the metrics include data related to activity of the content in terms of popularity and the historical performance includes monetization realized from the similar advertisements when placed on the selected websites.

22. A method as recited in claim 1, further comprising:
receiving via the one of the brand-centric websites likes and dislikes of users; and
changing presentation of the content of the one of the brand-centric websites based on the likes and dislikes.

23. A method as recited in claim 1, further comprising populating the content-related websites with the advertisement when the one of the brand-centric websites is populated with the advertisement.

24. A method as recited in claim 1, further comprising processing the obtained metrics and the historical performance to determine a plurality of content-related websites, at least one of the determined content-related websites different from at least one of the content-related websites that are suggested.

25. A method as recited in claim 1, wherein the one of the brand-centric websites is defined by the content modules, each of the content modules contains text, or images, or video clips, or graphics, or a combination thereof, wherein the text, or images, or video clips, or graphics, or the combination thereof is obtained from the content-related websites.

* * * * *